United States Patent
Stoller et al.

(10) Patent No.: US 11,963,490 B2
(45) Date of Patent: Apr. 23, 2024

(54) IMPLEMENTS, SYSTEMS, AND METHODS FOR APPLYING STRESS TO EARLY STAGE AGRICULTURAL PLANTS OF AGRICULTURAL FIELDS

(71) Applicant: PRECISION PLANTING LLC, Tremont, IL (US)

(72) Inventors: Jason Stoller, Eureka, IL (US); Todd Swanson, Morton, IL (US)

(73) Assignee: PRECISION PLANTING LLC, Tremont, IL (US)

( * ) Notice: Subject to any disclaimer, the term of this patent is extended or adjusted under 35 U.S.C. 154(b) by 1494 days.

(21) Appl. No.: 16/319,571

(22) PCT Filed: Jul. 19, 2017

(86) PCT No.: PCT/US2017/042909
§ 371 (c)(1),
(2) Date: Jan. 22, 2019

(87) PCT Pub. No.: WO2018/017746
PCT Pub. Date: Jan. 25, 2018

(65) Prior Publication Data
US 2021/0360869 A1    Nov. 25, 2021

Related U.S. Application Data

(60) Provisional application No. 62/365,828, filed on Jul. 22, 2016.

(51) Int. Cl.
*A01B 29/04* (2006.01)
*A01B 39/04* (2006.01)
(Continued)

(52) U.S. Cl.
CPC ............... *A01G 7/06* (2013.01); *A01B 29/04* (2013.01); *A01B 39/04* (2013.01); *A01B 39/08* (2013.01);
(Continued)

(58) Field of Classification Search
CPC ......... A01B 29/00; A01B 29/02; A01B 29/04; A01B 39/08; A01D 34/02; A01D 34/412
See application file for complete search history.

(56) References Cited

U.S. PATENT DOCUMENTS

| | | | |
|---|---|---|---|
| 4,186,878 A | | 2/1980 | Lestradet |
| 4,249,613 A | * | 2/1981 | Scribner ............... A01B 39/08 172/520 |

(Continued)

FOREIGN PATENT DOCUMENTS

| | | | |
|---|---|---|---|
| EP | 2708102 A1 | 3/2014 | |
| GB | 2117212 A | 2/1983 | |
| GB | 2117212 A | * 10/1983 | ............. A01B 27/00 |

OTHER PUBLICATIONS

INPI Argentina, Search Report prepared for related AR Application No. 20170102060, dated Nov. 4, 2021.
(Continued)

*Primary Examiner* — Kristen C Hayes

(57) ABSTRACT

Described herein are implements, systems, and methods for applying stress to agricultural plants of agricultural fields. In one embodiment, an agricultural implement comprises a frame transverse to a direction of travel of the agricultural implement and a stress mechanism disposed on the frame in operation such that the stress mechanism applies a force to the row of plants as the agricultural implement moves through the field.

32 Claims, 24 Drawing Sheets

(51) Int. Cl.
| | |
|---|---|
| A01B 39/08 | (2006.01) |
| A01B 51/04 | (2006.01) |
| A01B 61/04 | (2006.01) |
| A01B 63/00 | (2006.01) |
| A01B 63/24 | (2006.01) |
| A01C 23/04 | (2006.01) |
| A01G 7/06 | (2006.01) |
| A01G 22/40 | (2018.01) |
| A01M 7/00 | (2006.01) |

(52) U.S. Cl.
 CPC .............. *A01B 51/04* (2013.01); *A01B 61/04* (2013.01); *A01B 63/008* (2013.01); *A01B 63/24* (2013.01); *A01C 23/047* (2013.01); *A01G 22/40* (2018.02); *A01M 7/0042* (2013.01)

(56) References Cited

U.S. PATENT DOCUMENTS

| | | | | |
|---|---|---|---|---|
| 4,753,297 | A * | 6/1988 | Mayeda | A01B 39/08 111/139 |
| 4,779,684 | A * | 10/1988 | Schultz | A01C 5/064 172/1 |
| 5,613,566 | A * | 3/1997 | Cox | A01B 49/027 172/174 |
| 5,988,528 | A | 11/1999 | Krohn et al. | |
| 6,968,907 | B1 * | 11/2005 | Raper | A01B 29/045 172/518 |
| 8,626,408 | B1 * | 1/2014 | Satzler | A01B 69/003 701/50 |
| 2012/0227992 | A1 * | 9/2012 | Henry | A01B 63/114 172/4 |
| 2014/0026792 | A1 * | 1/2014 | Bassett | A01C 7/208 111/121 |
| 2014/0034339 | A1 | 2/2014 | Sauder et al. | |
| 2015/0216102 | A1 * | 8/2015 | Georgoulias | A01B 45/023 172/22 |
| 2015/0216105 | A1 * | 8/2015 | Butler | A01B 61/046 172/27 |

OTHER PUBLICATIONS

Davidson, "Can Stressing Soybeans Boost Yields?" AGFAX, downloaded from: http://agfax.com/2013/07/24/can-stressing-soybeans-boost-yields/ , 3 pages, Jul. 24, 2013.
Cherveny, "Clara City Farmer's Invention Reduces Soil Erosion", downloaded from: http://www.wctrib.com/news/region/3732715-clara-city-farmers-invention-reduces-soil-erosion, West Central Tribune, Apr. 27, 2015, 3 pages.
Culti Roller, Manufacturer from Tebben Enterprises, downloaded from: http://www.hellotrade.com/tebben-enterprises/culti-roller.html, May 3, 2016, 4 pages.
Early Season Soybean Stress Matters, Farm Journal, 2016, 3 pages.
DeJong-Hughes, "Management Considerations for Rolling Soybean in the Upper Midwest", University of Minnesota Extension, 2012.
Land-rolling Soybeans in 2013, MSU Extension, May 3, 2016, 4 pages.
DeJong-Hughes et al., Soybean Production, Management Considerations for Rolling Soybean in the Upper Midwest, Univ. of MN Extension, May 3, 2016, 7 pages.
Lauritsen, "Minnesota Farmer's Invention May Help Cut Down On Soil Erosion" CBS Minnesota/WCCO, Apr. 10, 2015, 4 pages.
Byrnes, "Roll Out The Beans", Progressive Farmer Dec. 2015, 1 page.
Morrison, Rolling Between the Rows| Minnesota Farmer's Invention Smashes Rootballs Between Rows, Extends Window for Ground Rolling, Corn + Soybean Digest, Jan. 1, 2012, 8 pages.
Morrison, Rolling Stones|If you Have Rocks (and Root Balls), Should you Roll?, Corn + Soybean Digest, Jan. 1, 2011, 8 pages.
Rueber, "Timing of Land Rolling for Soybeans", Iowa State University, Northern Research and Demonstration Farm, 2 pages, 2011.
DeJong-Hughes, "Tips for ground rolling emerged soybeans", Corn + Soybean Digest, Jun. 12, 2015, 10 pages.
Buntjer, Julie. "Regional Farmers on a Roll." Agweek. May 21, 2010. Web. Jul. 7, 2010. <http://www.agweek.com/event/article/id/36603/publisher_ID/24/>.
DeJong-Hughes, Jodi. "Is Ground Rolling For You?" Speech. University of Minnesota Extension, 2009. Web. Jul. 6, 2010. <http://www.smallgrains.org/PGConf08/DeJong08.pdf.
Edwards, William. "2010 Iowa Farm Custom Rate Survey." Iowa State University Extension, Spring 2010. Web. Jul. 6, 2010. <http://www.extension.iastate.edu/NR/rdonlyres/4F4F287B-B8AC-493F-8E1F-23AF4528C359/118740/customratesurvey2010.pdf>.
Endres, Greg, and Bob Henson. "Impact Of Field Rolling on Soybean Performance." NDSU Agriculture. Web. Jul. 6, 2010. <http://www.ag.ndsu.nodak.edu/carringt/03data/03 Annual Report/ Impact of Field Rolling on Soybean Performance.htm>.
Fore, Zachary. "Rock Rolling Soybeans." Northwest Research and Outreach Center | University of Minnesota. University of Minnesota Extension, Jun. 3, 2009. Web. Jul. 7, 2010. <http://www.nwroc.umn.edu/cropping_issues/2004/issue4/06_04_04_no_4.htm>.
Hagen, Dick. "Opinions Differ on If, When Rolling Fields Is Right." The Land. Mar. 12, 2010. Web. Jul. 6, 2010. <http://www.thelandonline.com/currentedition/x1897235550/Opinions-differ-on-if-when-rolling-fields-is-right>.
Kandel, Hans, and Greg Endres. "Rolling Soybean Ground." North Dakota State University Extension. Web. Jul. 6, 2010. <http://www.ndsoybean.org/assets/files/ROLLING%20SOYBEAN%20GROUND.pdf>.
Ransom, Joel. "Rolling Soybeans and Peas." Plant Science. NDSU Agriculture, May 25, 2006. Web. Jul. 6, 2010. <http://www.ag.ndsu.nodak.edu/aginfo/entomology/ndsucpr/Years/2006/may/25/psci_25may06.htm>.
International Preliminary Report on Patentability for PCT/US2017/042909, dated Jan. 31, 2019, 8 pages.
PCT International Search Report and Written Opinion for PCT Application No. PCT/US2017/042909, 8 pages, dated Sep. 27, 2017.
Cope, Aimee, "Early Season Soybean Stress Matters", Farm Journal, Agweb.com, May 10, 2016, 7 pages.

\* cited by examiner

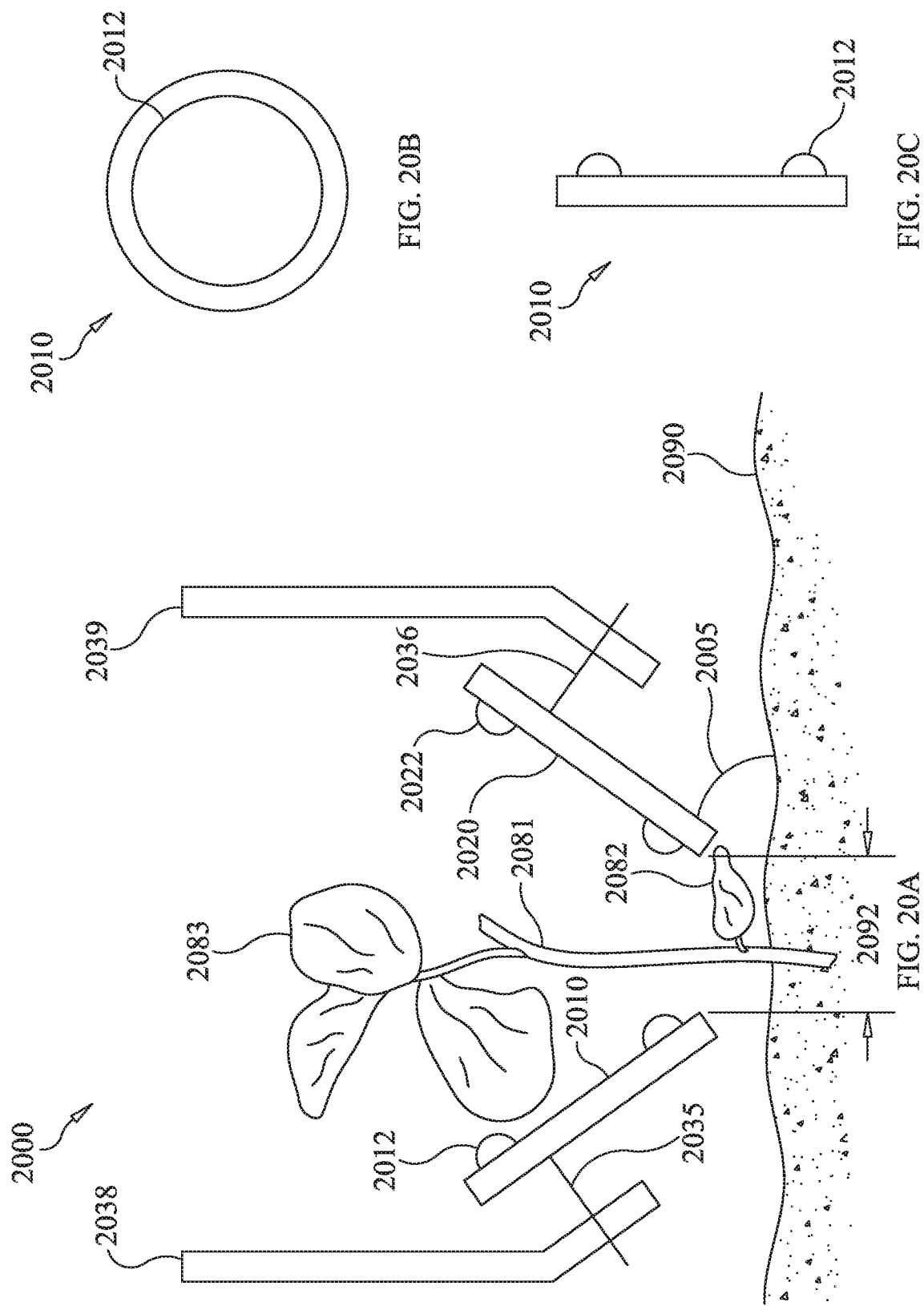

IMPLEMENTS, SYSTEMS, AND METHODS FOR APPLYING STRESS TO EARLY STAGE AGRICULTURAL PLANTS OF AGRICULTURAL FIELDS

RELATED APPLICATIONS

This application claims priority under 35 U.S.C. § 371 to International Application No. PCT/US17/042909 filed Jul. 19, 2017, entitled IMPLEMENTS, SYSTEMS, AND METHODS FOR APPLYING STRESS TO EARLY STAGE AGRICULTURAL PLANTS OF AGRICULTURAL FIELDS which claims the benefit of U.S. Provisional Application No. 62/365,828, filed on Jul. 22, 2016 entitled: IMPLEMENTS, SYSTEMS, AND METHODS FOR APPLYING STRESS TO EARLY STAGE AGRICULTURAL PLANTS OF AGRICULTURAL FIELDS.

TECHNICAL FIELD

Embodiments of the present disclosure relate to implements, systems, and methods for applying stress to early stage agricultural plants (e.g., soybeans) of agricultural fields.

BACKGROUND

Implements having rollers are used for compacting soil, pushing rocks below ground level, smoothing a ground surface, improving harvesting efficiency, reducing combine damage, and preventing soil erosion of agricultural plants (e.g., corn, soybeans) in a field.

BRIEF DESCRIPTION OF THE DRAWINGS

The present disclosure is illustrated by way of example, and not by way of limitation, in the figures of the accompanying drawings and in which:

FIG. 20A illustrates a rear view of a row unit for applying stress to a row of plants (e.g., soybean plants, corn plants, etc.) in accordance with one embodiment.

FIG. 20B illustrates a top view of an angled member 2010 for applying stress to a row of plants (e.g., soybean plants, corn plants, etc.) in accordance with one embodiment.

FIG. 20C illustrates a side view of an angled member 2010 for applying stress to a row of plants (e.g., soybean plants, corn plants, etc.) in accordance with one embodiment.

SUMMARY

Described herein are systems, implements, and methods for applying stress to early stage agricultural plants (e.g., soybeans) of agricultural fields.

In one embodiment, an agricultural implement comprises a frame transverse to a direction of travel of the agricultural implement and a stress mechanism disposed on the frame in operation such that the stress mechanism applies a force to the row of plants as the agricultural implement moves through the field.

DETAILED DESCRIPTION

Described herein are systems, implements, and row units having mechanisms for applying stress to agricultural plants of agricultural fields at an early stage of development to promote growth of the agricultural plants. The applied stress can cause additional nodes to be added to plants and thus improve yield.

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
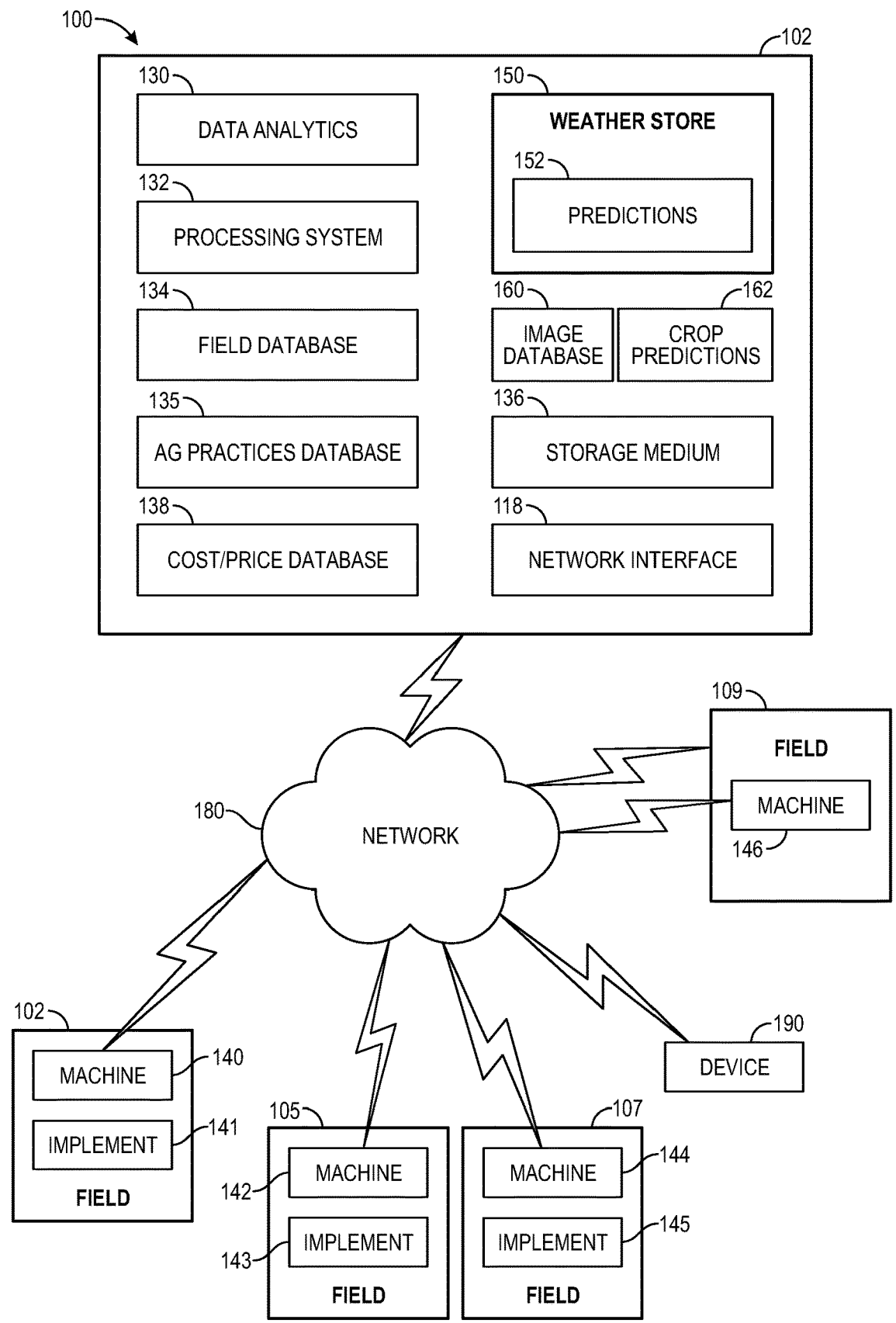
FIG. 1 shows an example of a system for performing agricultural operations (e.g., applying stress to early stage plants) of agricultural fields including operations of a machine or an implement for applying stress to the plants in accordance with one embodiment.

FIG. 1 shows an example of a system for performing agricultural operations (e.g., applying stress to early stage plants) of agricultural fields including operations of a machine or an implement for applying stress to the plants in accordance with one embodiment. For example and in one embodiment, the system 100 may be implemented as a cloud based system with servers, data processing devices, computers, etc. Aspects, features, and functionality of the system 100 can be implemented in servers, planters, planter monitors, combines, laptops, tablets, computer terminals, client devices, user devices (e.g., device 190), handheld computers, personal digital assistants, cellular telephones, cameras, smart phones, mobile phones, computing devices, or a combination of any of these or other data processing devices.

In other embodiments, the system includes a network computer or an embedded processing device within another device (e.g., display device) or within a machine (e.g., planter, combine), or other types of data processing systems having fewer components or perhaps more components than that shown in FIG. 1. The system 100 (e.g., cloud based system) and agricultural operations can control and monitor liquid applications using an implement or machine. The system 100 includes machines 140, 142, 144, 146 and implements 141, 143, 145 coupled to a respective machine. The implements (or machines) can include at least one stress mechanism (e.g., rollers, horizontal bar, etc.) for applying stress to crops at an early stage of crop development. The implements (or machines) can include flow devices for controlling and monitoring liquid applications (e.g., spraying, fertilization) of crops and soil within associated fields (e.g., fields 102, 105, 107, 109). The system 100 includes an agricultural analysis system 102 that includes a weather store 150 with current and historical weather data, weather predictions module 152 with weather predictions for different regions, and at least one processing system 132 for executing instructions for controlling and monitoring different operations (e.g., liquid applications). The storage medium 136 may store instructions, software, software programs, etc. for execution by the processing system and for performing operations of the agricultural analysis system 102. In one example, storage medium 136 may contain a stress application prescription (e.g., stress application prescription that relates georeferenced positions in the field to stress rates or down forces). The implement 141 (or any of the implements) may include an implement 200 whose pump, flow sensors, flow controllers, and stress mechanism may be specifically the elements that are in communication with the network 180 for sending control signals or receiving as-applied data.

An image database 160 stores captured images of crops at different growth stages. A data analytics module 130 may perform analytics on agricultural data (e.g., images, weather, field, yield, etc.) to generate crop predictions 162 relating to agricultural operations.

A field information database 134 stores agricultural data (e.g., crop growth stage, soil types, soil characteristics, moisture holding capacity, etc.) for the fields that are being monitored by the system 100. An agricultural practices information database 135 stores farm practices information (e.g., as-applied planting information, as-applied spraying information, as-applied fertilization information, planting population, applied nutrients (e.g., nitrogen), yield levels, proprietary indices (e.g., ratio of seed population to a soil parameter), etc.) for the fields that are being monitored by the system 100. An implement can obtain liquid application data from the CMUs and provide this data to the system 100. A cost/price database 138 stores input cost information (e.g., cost of seed, cost of nutrients (e.g., nitrogen)) and commodity price information (e.g., revenue from crop).

The system 100 shown in FIG. 1 may include a network interface 118 for communicating with other systems or devices such as drone devices, user devices, and machines (e.g., planters, combines) via a network 180 (e.g., Internet, wide area network, WiMax, satellite, cellular, IP network, etc.). The network interface include one or more types of transceivers for communicating via the network 180.

The processing system 132 may include one or more microprocessors, processors, a system on a chip (integrated circuit), or one or more microcontrollers. The processing system includes processing logic for executing software instructions of one or more programs. The system 100 includes the storage medium 136 for storing data and programs for execution by the processing system. The storage medium 136 can store, for example, software components such as a software application for controlling and monitoring liquid applications or any other software application. The storage medium 136 can be any known form of a machine readable non-transitory storage medium, such as semiconductor memory (e.g., flash; SRAM; DRAM; etc.) or non-volatile memory, such as hard disks or solid-state drive.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 2:
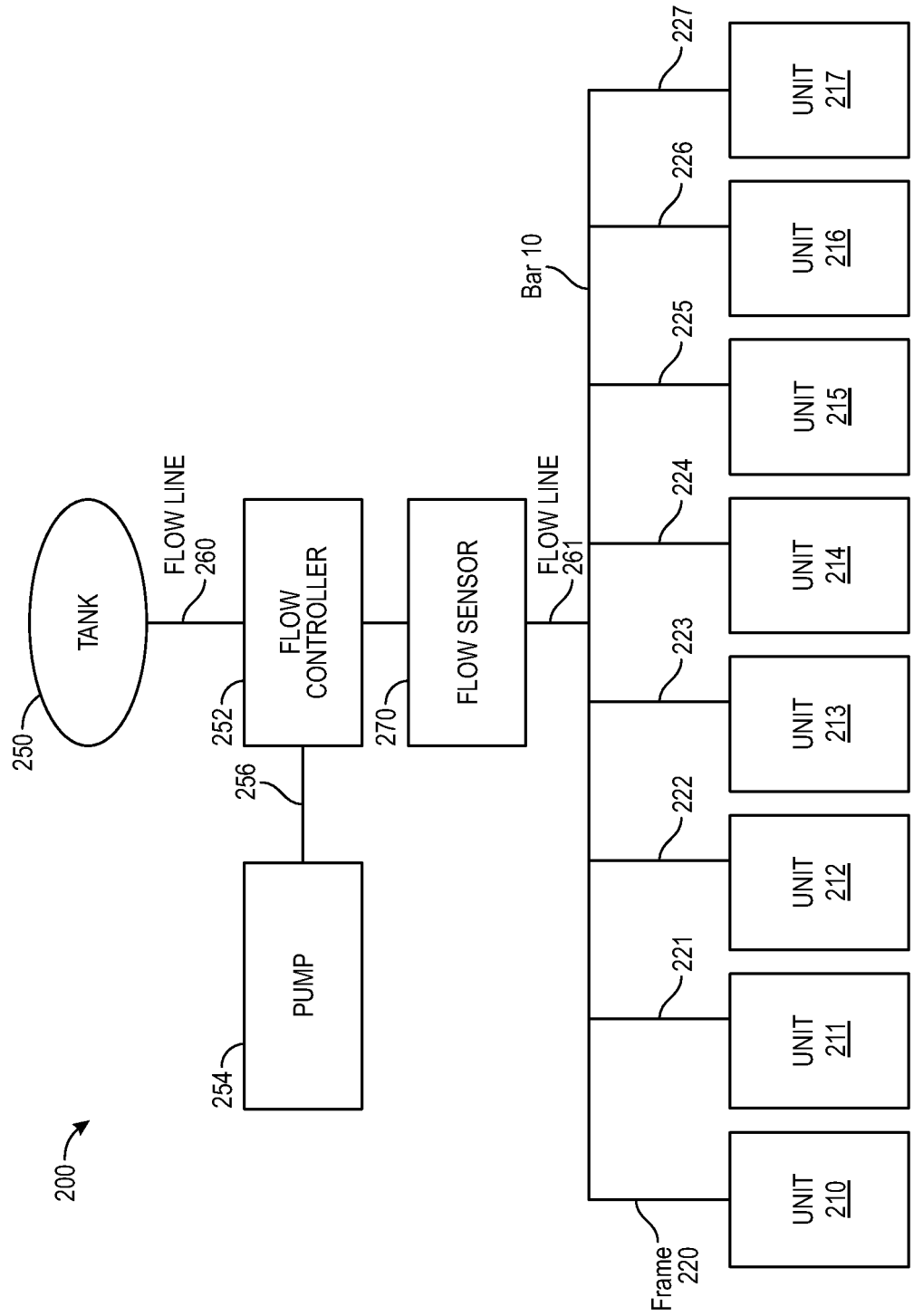
FIG. 2 illustrates an architecture of an implement 200 for delivering applications (e.g., liquid applications, fluid mixture applications) and applying stress to plants of agricultural fields in accordance with one embodiment.

FIG. 2 illustrates an architecture of an implement 200 for delivering applications (e.g., liquid applications, fluid mixture applications) and applying stress to plants of agricultural fields in accordance with one embodiment. The implement 200 includes at least one storage tank 250, flow lines 260 and 261, a flow controller 252 (e.g., valve), and at least one variable-rate pump 254 (e.g., electric, centrifugal, piston, etc.) for pumping and controlling application rate of a liquid (e.g., liquid application, semiliquid mixture) from the at least one storage tank to different row units 210-217, respectively of the implement. At least one flow sensor 270 can be utilized on the implement 200 either row-by-row or upstream of where the fluid branches out to the application units as illustrated in FIG. 2. The flow controller 252 can be row-by-row as opposed to implement-wide as shown in FIG. 2.

The row units are mechanically coupled to the linkage arms 220-227 which are mechanically coupled to a frame 10 (such as a toolbar, sidedress bar, or boom). Each row unit can include a stress mechanism (e.g., rollers, bars, contacting members, etc.) for applying stress to an early stage plant in an agricultural field. The row units can include any of the embodiments described herein in conjunction with FIGS. 3-13.

Figure 3:
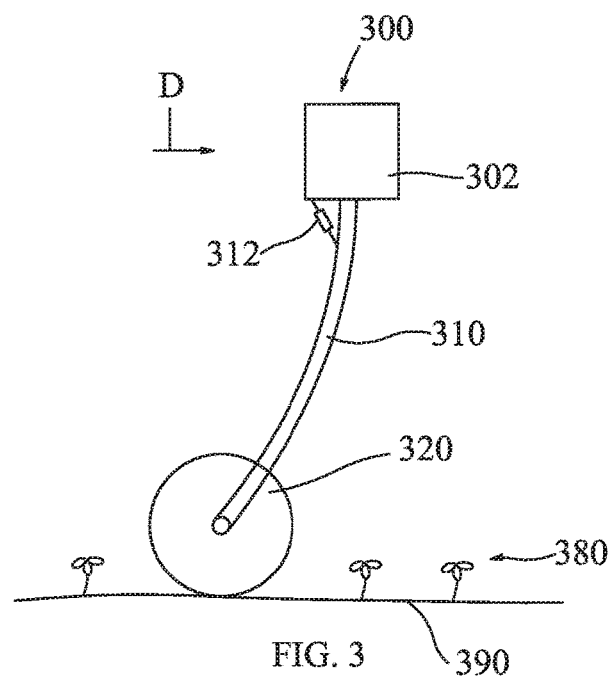
FIG. 3 illustrates a side view of a row unit 300 for applying a stress to a row of plants 380 (e.g., soybean plants, corn plants, etc.) in accordance with one embodiment.

FIG. 3 illustrates a side view of a row unit 300 for applying a stress to a row of plants 380 (e.g., soybean plants, corn plants, etc.) in accordance with one embodiment. It should be appreciated that the unit 300 is illustrated traveling in a direction D. The row unit 300 is preferably mounted to a transversely extending bar 302 (e.g., toolbar or boom, sidedress bar, etc.) drawn by a tractor or other implement. The row unit 300 preferably extends laterally above existing soybean plants 380 as the bar 302 traverses the field having a ground surface 390.

Continuing to refer to FIG. 3, the row unit 300 preferably comprises a downwardly-extending frame 310 to which a stress mechanism 320 (e.g., at least one roller, bar, etc.) is connected. In one example, the stress mechanism 320 rotates on the ground 380 as the row unit moves in a direction D and the stress mechanism 320 applies a stress (e.g., a force) to the early stage plants (e.g., V1 first trifoliolate soybean stage having one set of unfolded trifoliolate leaves, VC unrolled unifoliolate leaves, V2 second trifoliolate, etc.). The stress mechanism may apply a force (e.g., 1-200 lbs of downforce, 10-50 lbs of downforce, etc.) to the plants to cause growth of additional nodes. A biasing element 312 (e.g., pneumatic cylinder, hydraulic cylinder, spring, etc.) or other biasing element preferably biases the frame with respect to the bar 302. A length of the stress mechanism 320 may be designed based on a row spacing (e.g., 20", 30", etc.) with each stress mechanism having a length that can vary from slightly greater than a lateral of the soybean plant up to approximately one half of the row spacing between rows of plants. In one example, the stress mechanism 320 may have an adjustable lateral position (e.g., height) above the ground 380 depending on a height of the plants.

In another example, the row unit 300 may also function as a liquid application unit to spray (e.g., pressurized spray) a liquid application towards a base region of a plant (e.g., into soil within 3-4 inches of the base region of the plant, towards a region in which a base of the plant emerges from the soil. In this example, each row unit includes at least one liquid outlet that is preferably in fluid communication with a source (e.g., tank 250) containing an application (e.g., liquid application, crop inputs such as fertilizer, fungicide, herbicide or insecticide). Each liquid outlet described herein provides a pressurized spray (e.g., 1-200 psi, 5-100 psi, etc.) in a direction (e.g., substantially downward direction) towards a base region of a plant (e.g., into soil within 3-4 inches of the base region of the plant, towards a region in which a base of the plant emerges from the soil). In another example, at least one liquid outlet of an application unit provides a dribble of liquid (e.g., non-pressurized source) rather than a pressurized spray.

Figure 4:
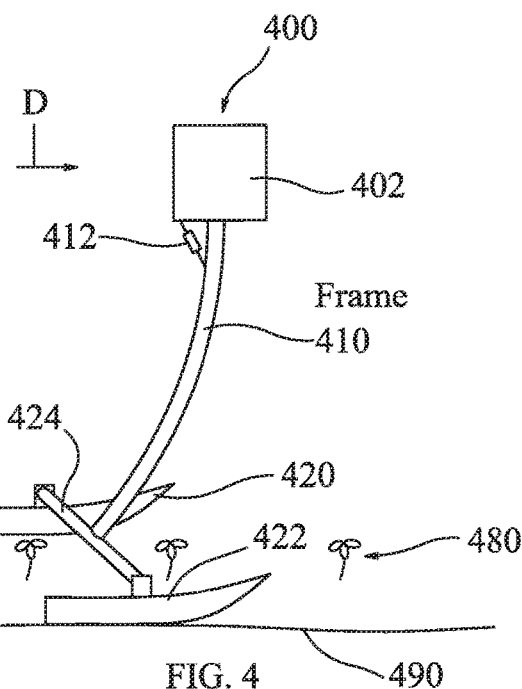
FIG. 4 illustrates a side view of a row unit 300 for applying a stress to a row of plants 480 (e.g., soybean plants, corn plants, etc.) in accordance with one embodiment.

FIG. 4 illustrates a side view of a row unit 300 for applying a stress to a row of plants 480 (e.g., soybean plants, corn plants, etc.) in accordance with one embodiment. It should be appreciated that the unit 400 is illustrated traveling in a direction D. The row unit 400 is preferably mounted to a transversely extending bar 402 (e.g., toolbar or boom, sidedress bar, etc.) drawn by a tractor or other implement. The row unit 400 preferably extends laterally above existing soybean plants 480 as the bar 402 traverses the field having a ground surface 490.

Continuing to refer to FIG. 4, the row unit 400 preferably comprises a downwardly-extending frame 410 to which a stress mechanism 424 (e.g., at least one bar, etc.) and ground contacting members 420 and 422 (e.g., skiis) are connected. In one example, the stress mechanism 424 applies a stress (e.g., a force) to the early stage plants (e.g., V1 first trifoliolate soybean stage having one set of unfolded trifoliolate leaves, VC unrolled unifoliolate leaves, V2 second trifoliolate, etc.). The stress mechanism may apply a force (e.g., 1-200 lbs of downforce, 10-50 lbs of downforce, etc.) to the plants to cause growth of additional nodes. A biasing element 412 (e.g., pneumatic cylinder, hydraulic cylinder, spring, etc.) or other biasing element preferably biases the frame with respect to the bar 402. A length of the stress mechanism 424 may be designed based on a row spacing (e.g., 20", 30", etc.) with each stress mechanism having a length that can vary from slightly greater than a lateral region encompassed by the soybean plant up to approximately one half of the row spacing between rows of plants. In one example, the stress mechanism 424 may have an adjustable lateral position (e.g., height) above the ground 480 depending on a height of the plants.

In another example, the row unit 400 may also function as a liquid application unit to spray (e.g., pressurized spray) a liquid application towards a base region of a plant (e.g., into soil within 3-4 inches of the base region of the plant, towards a region in which a base of the plant emerges from the soil. In this example, each row unit includes at least one liquid outlet that is preferably in fluid communication with a source (e.g., tank 250) containing an application (e.g., liquid application, crop inputs such as fertilizer, fungicide, herbicide or insecticide). Each liquid outlet described herein provides a pressurized spray (e.g., 1-200 psi, 5-100 psi, etc.) in a direction (e.g., substantially downward direction) towards a base region of a plant (e.g., into soil within 3-4 inches of the base region of the plant, towards a region in which a base of the plant emerges from the soil). In another example, at least one liquid outlet of an application unit provides a dribble of liquid (e.g., non-pressurized source) rather than a pressurized spray.

Figure 5:
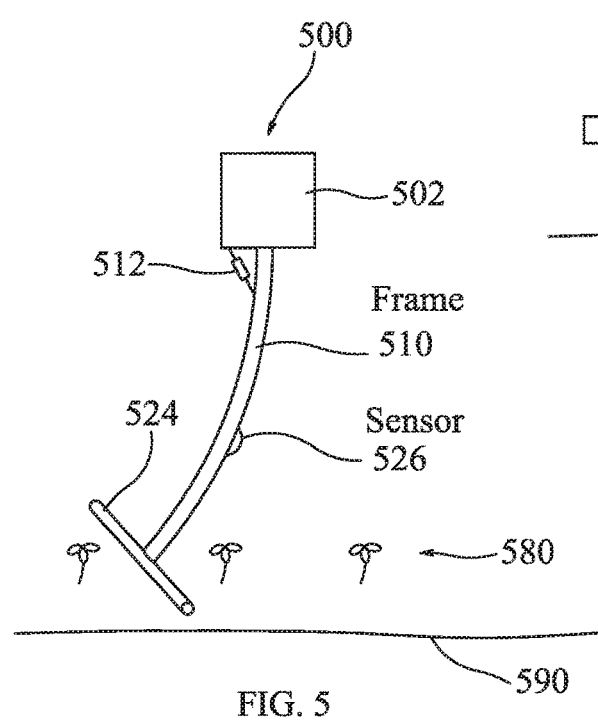
FIG. 5 illustrates a side view of a row unit 500 for applying a stress to a row of plants 580 (e.g., soybean plants, corn plants, etc.) in accordance with one embodiment.

FIG. 5 illustrates a side view of a row unit 500 for applying a stress to a row of plants 580 (e.g., soybean plants, corn plants, etc.) in accordance with one embodiment. It should be appreciated that the unit 500 is illustrated traveling in a direction D. The row unit 500 includes similar components in comparison to the row unit 400, except that the row unit 500 does not include ground contacting members. The row unit 500 is preferably mounted to a transversely extending frame 502 (e.g., toolbar or boom, sidedress bar, etc.) drawn by a tractor or other implement. The row unit 500 preferably extends laterally above existing soybean plants 580 as the bar 502 traverses the field having a ground surface 590.

Continuing to refer to FIG. 5, the row unit 500 preferably comprises a downwardly-extending frame 510 to which a proximity sensor 526 and a stress mechanism 524 (e.g., at least one bar, etc.) are connected. In one example, the stress mechanism 524 applies a stress (e.g., a force) to the early stage plants (e.g., V1 first trifoliolate soybean stage having one set of unfolded trifoliolate leaves, VC unrolled unifoliolate leaves, V2 second trifoliolate, etc.). The stress mechanism may apply a force (e.g., 1-200 lbs of downforce, 10-50 lbs of downforce, etc.) to the plants to cause growth of additional nodes. A biasing element 512 (e.g., pneumatic cylinder, hydraulic cylinder, spring, etc.) or other biasing element preferably biases the frame with respect to the bar 502. A length of the stress mechanism 524 may be designed based on a row spacing (e.g., 20", 30", etc.) with each stress mechanism having a length that can vary from slightly greater than a lateral region encompassed by the soybean plant up to approximately one half of the row spacing between rows of plants. In one example, the stress mechanism 524 may have an adjustable lateral position (e.g., height) above the ground 580 depending on a height of the plants. The stress mechanism 524 may be positioned at a height above the ground based on sensed data from the proximity sensor 526 which senses a distance from the sensor to the ground or a distance from the sensor to the plants.

Figure 6:
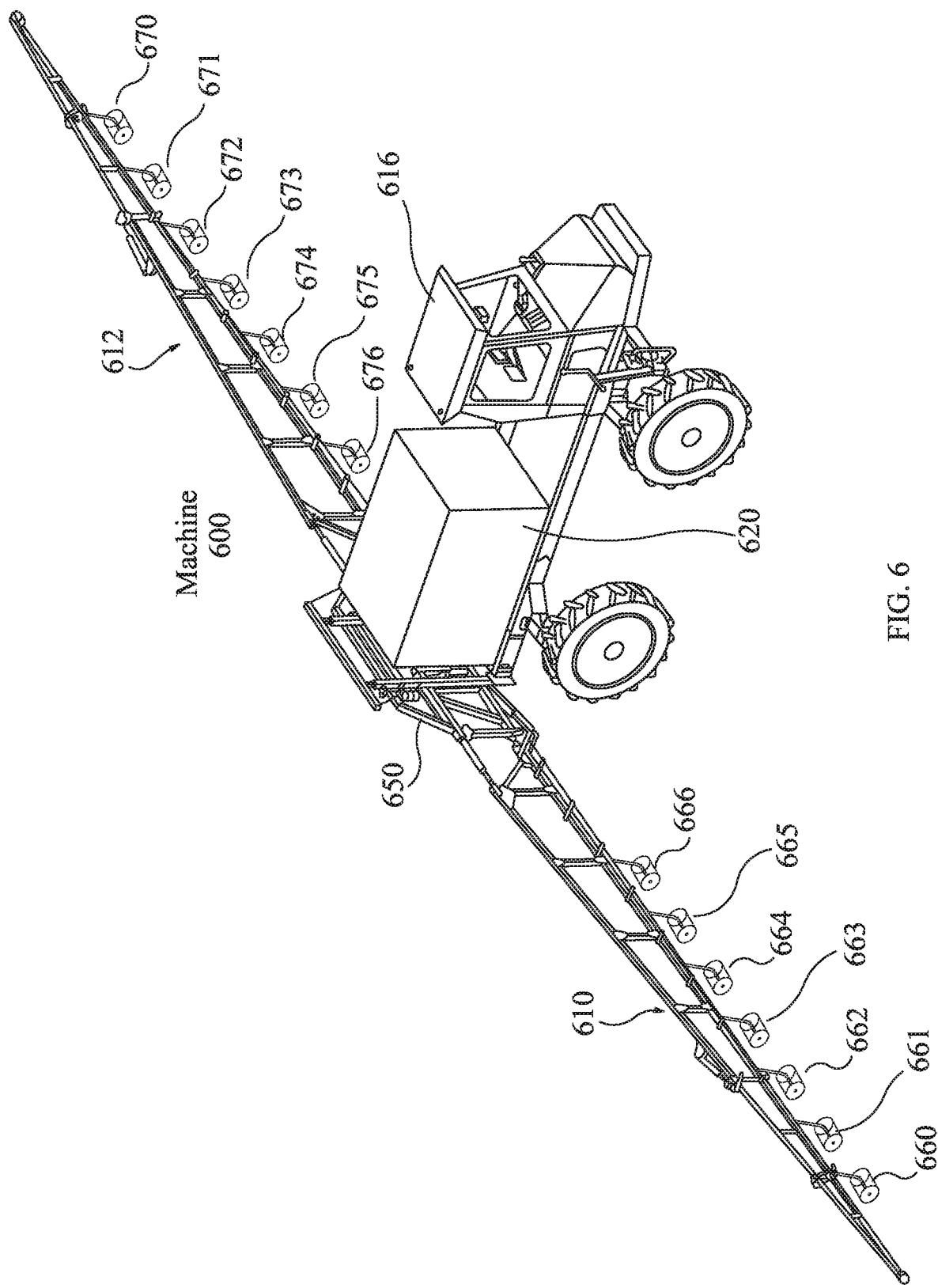
FIG. 6 illustrates a machine having stress mechanisms for applying stress to plants of a field in accordance with one embodiment.

FIG. 6 illustrates a machine having stress mechanisms for applying stress to plants of a field in accordance with one embodiment. A machine 600 (e.g., vehicle, sprayer) is capable of applying liquid applications to agricultural crops by using one or two booms 610 and 612 that can be extended perpendicularly to the machine for spraying and each of which are retractable to the machine for transport. Machine 600 preferably is self-propelled and has an operator's cab 616. The machine 600 also preferably has a tank 620 for carrying the chemicals to be applied via chemical delivery conduits and nozzles. Booms 610 and 612 are supported by a center section 650 which may be used to raise and lower booms 610 and 612 simultaneously.

The boom 610 includes row units 660-666 and the boom 612 includes row units 670-676. These row units include similar components and functionality in comparison to the row units of FIGS. 2 and 3. Each row unit includes a stress mechanism (e.g., roller, etc.) for applying stress directly to rows of early stage plants. The stress mechanism may apply a force (e.g., 1-200 lbs of downforce, 10-50 lbs of downforce, etc.) to the plants to cause growth of additional nodes.

Figure 7:
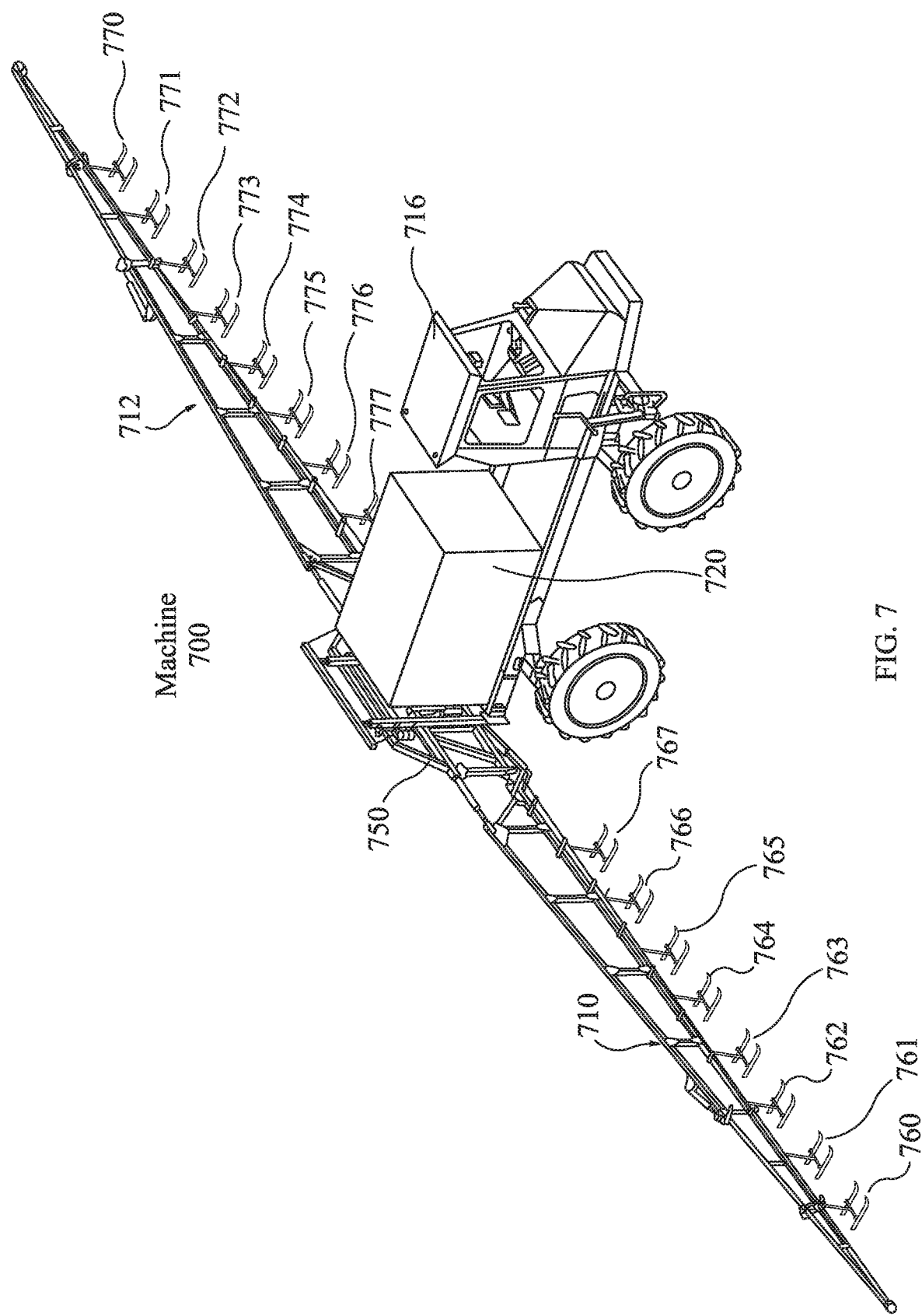
FIG. 7 illustrates a machine having stress mechanisms for applying stress to plants of a field in accordance with one embodiment.

FIG. 7 illustrates a machine having stress mechanisms for applying stress to plants of a field in accordance with one embodiment. A machine 700 (e.g., vehicle, sprayer) is capable of applying liquid applications to agricultural crops by using one or two booms 710 and 712 that can be extended perpendicularly to the machine for spraying and each of which are retractable to the machine for transport. Machine 700 preferably is self-propelled and has an operator's cab 716. The machine 700 also preferably has a tank 720 for carrying the chemicals to be applied via chemical delivery conduits and nozzles. Booms 710 and 712 are supported by a center section 750 which may be used to raise and lower booms 710 and 712 simultaneously.

The boom 710 includes a plurality of row units (e.g., 760-763 . . . , 768, etc.) and the boom 712 includes a plurality of row units (e.g., 770-773 . . . , 778, etc.). These row units include similar components and functionality in comparison to the row units of FIGS. 2 and 4. Each row unit includes a stress mechanism (e.g., bar for each row of plants, etc.) for applying stress directly to rows of early stage plants. The stress mechanism may apply a force (e.g., 1-200 lbs of downforce, 10-50 lbs of downforce, etc.) to the plants to cause growth of additional nodes.

Figure 8:
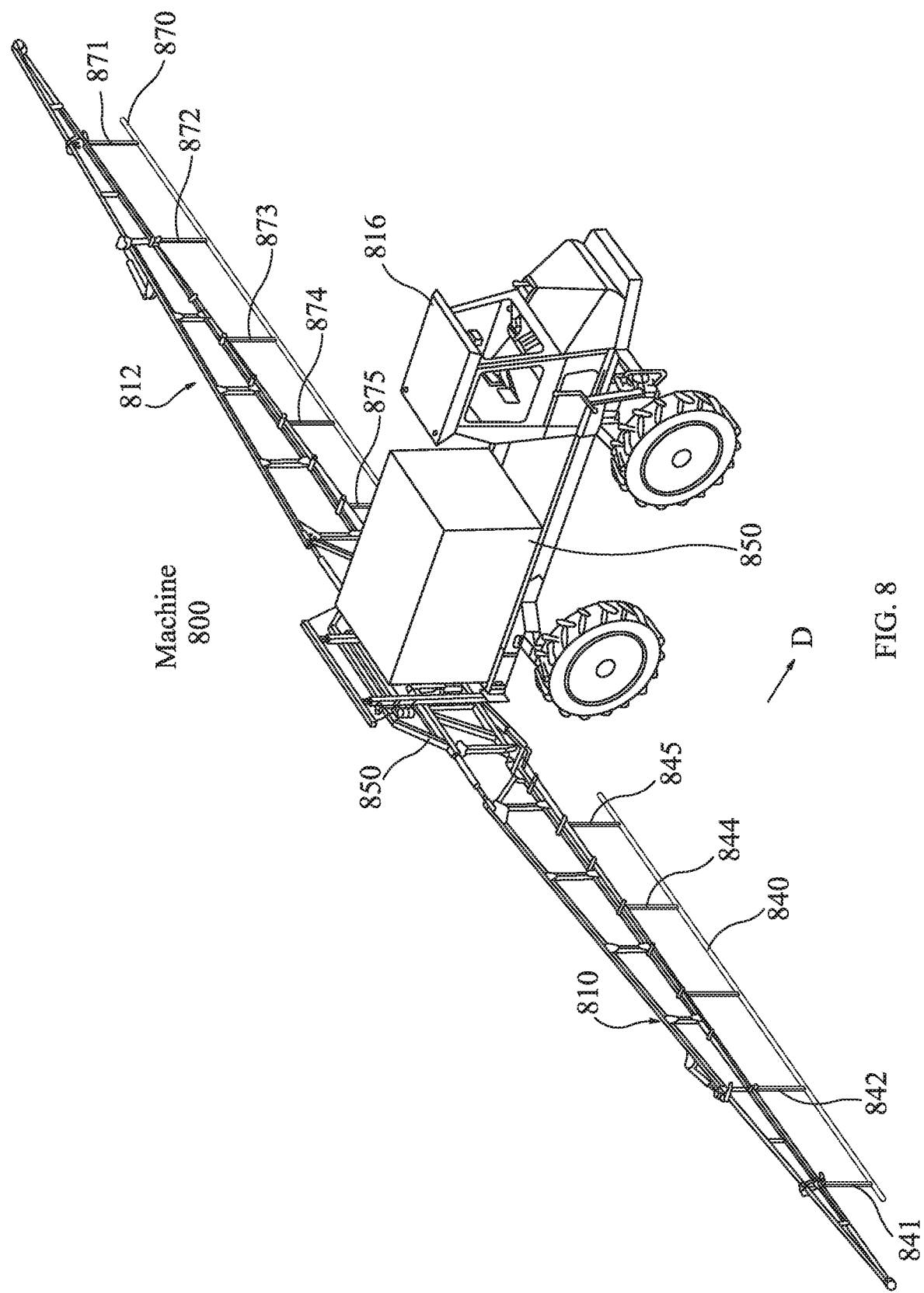
FIG. 8 illustrates a machine having stress mechanisms for applying stress to plants of a field in accordance with one embodiment.

FIG. 8 illustrates a machine having stress mechanisms for applying stress to plants of a field in accordance with one embodiment. A machine 800 (e.g., vehicle, sprayer) is capable of applying liquid applications to agricultural crops by using one or two booms 810 and 812 that can be extended perpendicularly to the machine for spraying and each of which are retractable to the machine for transport. Machine 800 preferably is self-propelled and has an operator's cab 816. The machine 800 also preferably has a tank 820 for carrying the chemicals to be applied via chemical delivery conduits and nozzles. Booms 810 and 812 are supported by a center section 850 which may be used to raise and lower booms 810 and 812 simultaneously.

The boom 810 includes a plurality of frames (e.g., 841-845, etc.) for supporting a stress mechanism 840 (e.g., a bar) that is transversely positioned with respect to a direction of travel D and rows of plants for applying stress to the rows of plants. The boom 812 includes a plurality of frames (e.g., 871-875, etc.) for supporting a stress mechanism 870 (e.g., a bar) that is transversely positioned with respect to a direction of travel D and rows of plants for applying stress to the rows of plants. Each stress mechanism (e.g., a bar for a plurality of rows of plants, etc.) applies stress directly to rows of early stage. The stress mechanism may apply a force (e.g., 1-200 lbs of downforce, 10-50 lbs of downforce, etc.) to the plants to cause growth of additional nodes.

Figure 9:
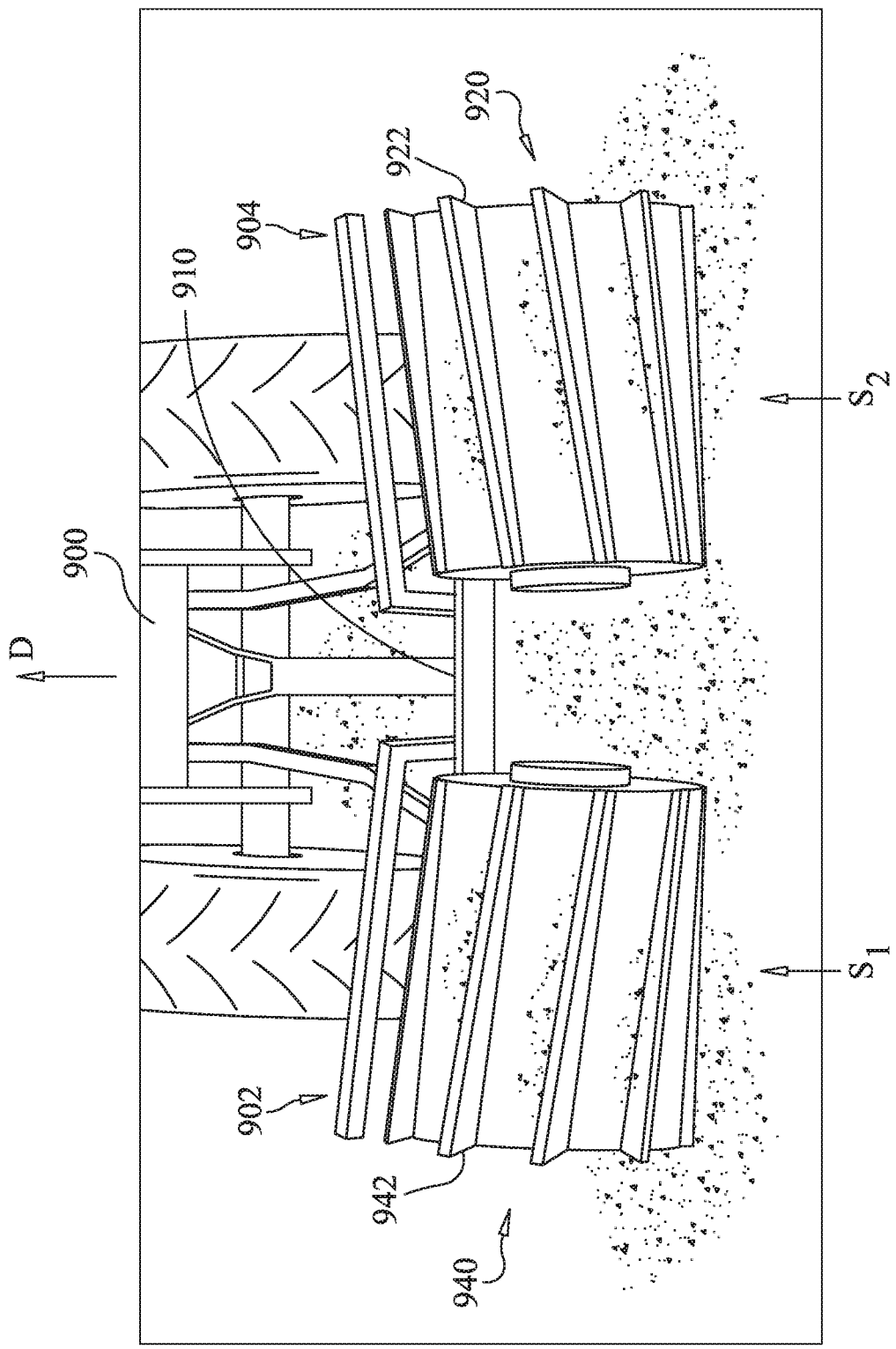
FIG. 9 illustrates a rear view of row units for applying stress to rows S1 and S2 of plants (e.g., soybean plants, corn plants, etc.) in accordance with one embodiment.

FIG. 9 illustrates a rear view of a tractor 900 that is pulling row units for applying stress to rows S1 and S2 of plants (e.g., soybean plants, corn plants, etc.) in accordance with one embodiment. The row units 902 and 904 are preferably mounted to a transversely extending frame 910 (e.g., toolbar or boom, sidedress bar, etc.) drawn by a tractor or other implement. The row units preferably extend laterally above existing soybean plants as the frame 910 traverses the field having a ground surface.

Each row unit includes a stress mechanism 920, 940 (e.g., at least one roller with slats (e.g., 922, 942), bar, etc.). In one example, the stress mechanism 920, 940 rotates on the ground as the row unit moves in a direction D and the stress mechanism 920, 940 applies a stress (e.g., a force) to the early stage plants (e.g., V2 second trifoliolate, V4, R2, etc.). The stress mechanism may apply a force (e.g., 1-200 lbs of downforce, 10-50 lbs of downforce, etc.) to the plants to cause growth of additional nodes. A length of the stress mechanism 920, 940 may be designed based on a row spacing (e.g., 20", 30", etc.) with each stress mechanism having a length that can vary from slightly greater than a lateral width of the soybean plant up to approximately one half of the row spacing between rows of plants.

Figure 10:
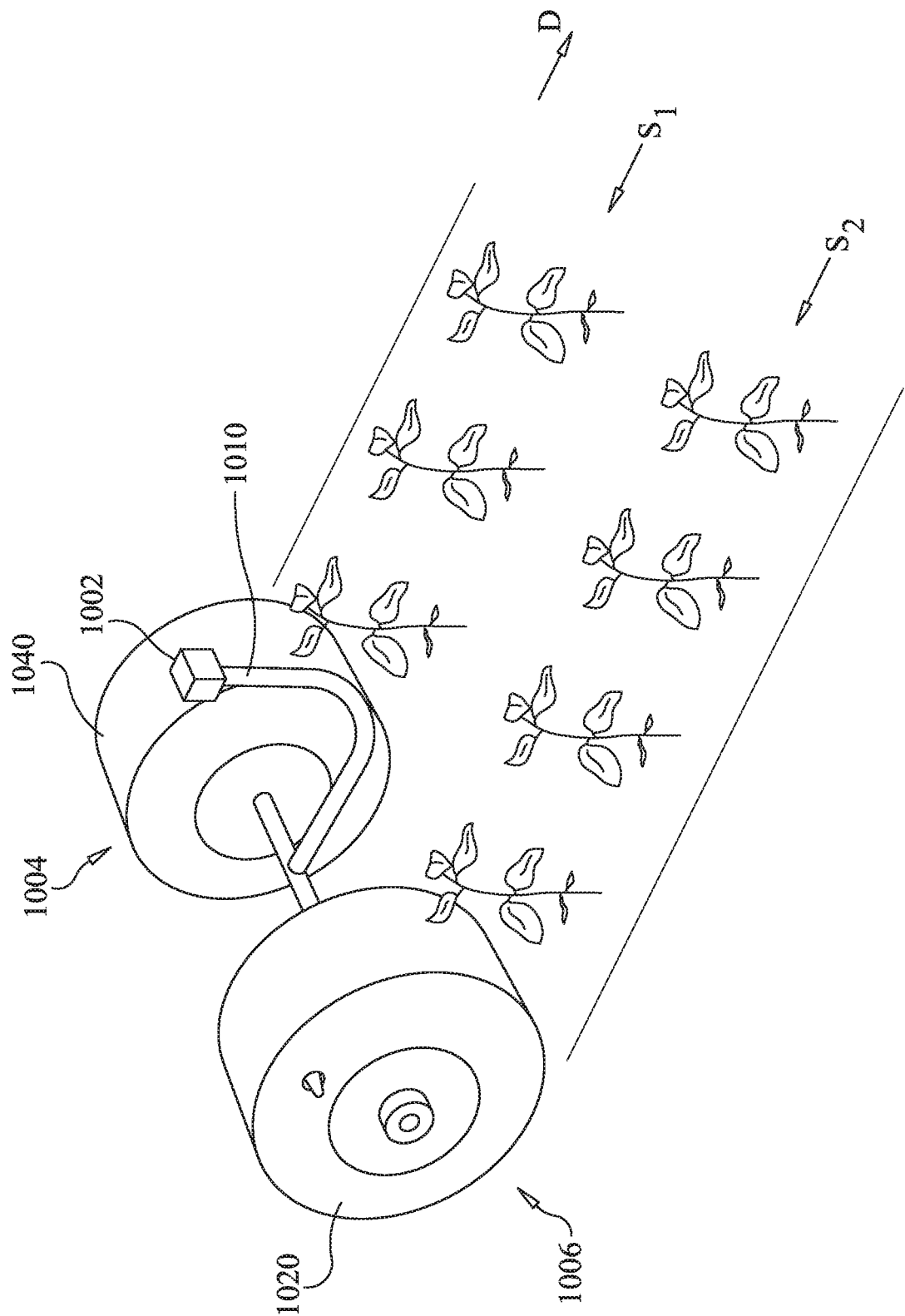
FIG. 10 illustrates a rear view of row units for applying stress to rows S1 and S2 of plants (e.g., soybean plants, corn plants, etc.) in accordance with one embodiment.

FIG. 10 illustrates a rear view of row units for applying stress to rows S1 and S2 of plants (e.g., soybean plants, corn plants, etc.) in accordance with one embodiment. The row units 1004 and 1006 are preferably mounted to a transversely extending frame 1002 (e.g., toolbar or boom, sidedress bar, etc.) drawn by a tractor or other implement. The row units preferably extend laterally above existing soybean plants as the downwardly extending frame 1010 traverses the field having a ground surface. Row units 1004 and 1006 are connected to an axle 1111, which is connected to downwardly extending frame 1010.

Each row unit includes a stress mechanism 1020, 1040 (e.g., at least inflatable roller, tire, wheel, etc.). In one example, the stress mechanism 1020, 1040 rotates on the ground as the row unit moves in a direction D and the stress mechanism 1020, 1040 applies a stress (e.g., a force) to the early stage plants (e.g., V2 second trifoliolate, V4, R2, etc.). The stress mechanism may apply a force (e.g., 1-5 psi, 5-150 psi, etc.) to the plants to cause growth of additional nodes. A length of the stress mechanism may be designed based on a row spacing (e.g., 20", 30", etc.) with each stress mechanism having a length that can vary from slightly greater than a lateral width of the soybean plant up to approximately one half of the row spacing between rows of plants.

Figure 11A:
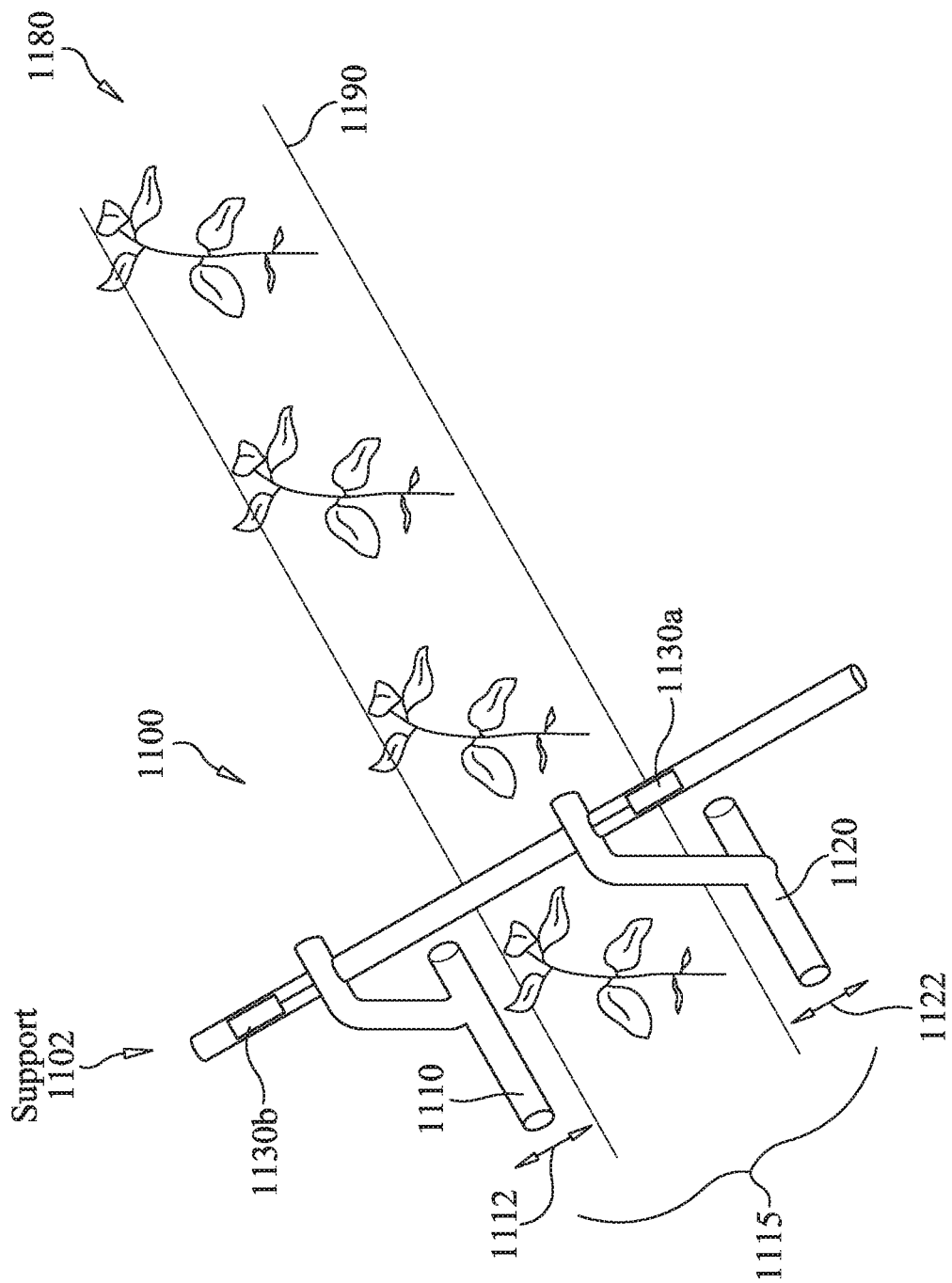
FIG. 11A illustrates an isometric view of a row unit for applying stress to a row of plants (e.g., soybean plants, corn plants, etc.) in accordance with one embodiment.

FIG. 11A illustrates an isometric view of a row unit for applying stress to a row of plants (e.g., soybean plants, corn plants, etc.) in accordance with one embodiment. The row unit 1100 is preferably mounted to a transversely extending support frame 1102 that can be mounted or coupled to a frame 10 (e.g., toolbar or boom, sidedress bar, etc.) drawn by a tractor or other implement. Alternatively, the row unit 1100 is coupled or attached to the frame 10. The row unit preferably extends laterally above existing soybean plants as the support bar 1102 traverses the field having a ground surface 1190. The bar 1102 may be positioned above the soybean plants and can have an adjustable height above the ground surface 1190 depending on a height of the soybean plants.

The row unit 1100 includes a stress mechanism 1115 (e.g., sliding crimpers 1110 and 1120, etc.) that is illustrated in a non-stress applying position in FIG. 11A. In one example, the stress mechanism 1115 includes sliding crimpers 1110 and 1120 that slide in directions 1112, 1122 and apply a stress (e.g., a force) to the early stage plants (e.g., V2 second trifoliolate, V4, R2, etc.) in a row 1180. The stress mechanism may apply a force to the plants to cause growth of additional nodes. As illustrated in FIG. 11A, support frame 1102 is disposed through sliding crimpers 1110 and 1120. At least one of sliding crimpers 1110 and 1120 slides over support frame 1102 by actuation from an actuator 1130 (1130a and 1130b).

Figure 11B:
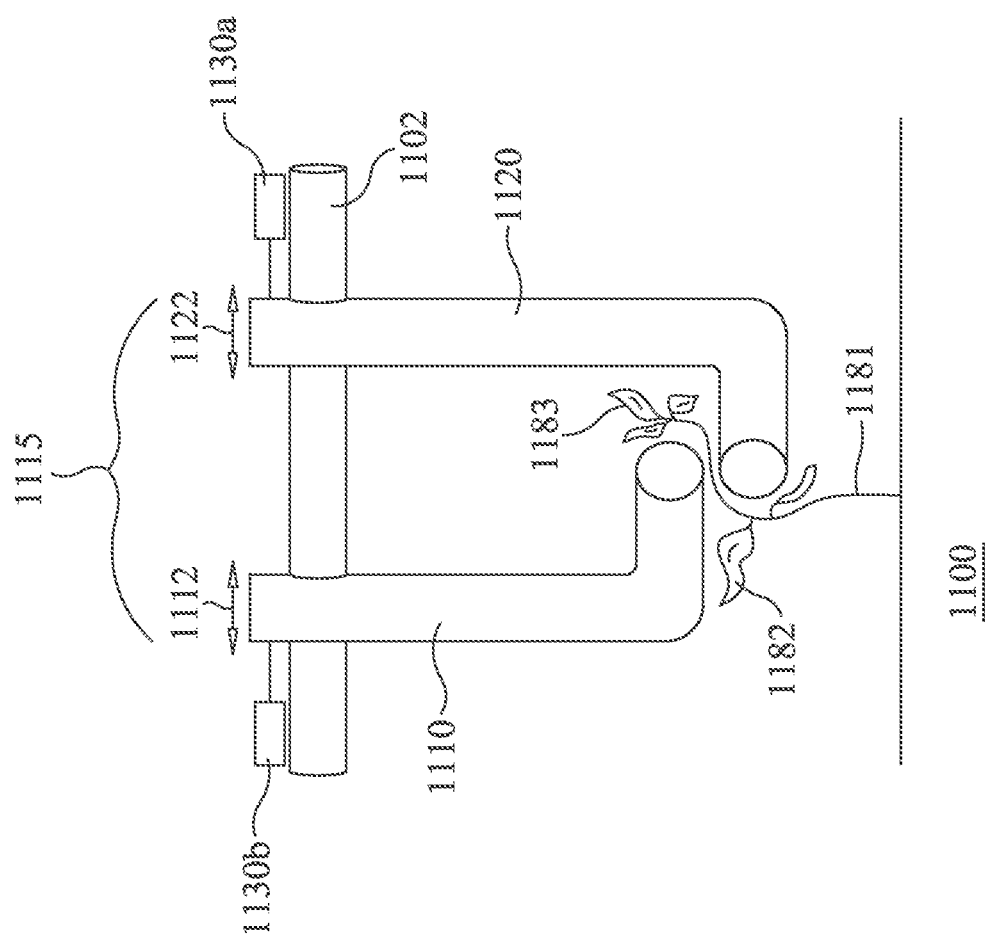
FIG. 11B illustrates a rear view of a row unit in a stress applying position for applying stress to a row of plants (e.g., soybean plants, corn plants, etc.) in accordance with one embodiment.

FIG. 11B illustrates a rear view of a row unit in a stress applying position for applying stress to a row of plants (e.g., soybean plants, corn plants, etc.) in accordance with one embodiment. The row unit 1100 includes a stress mechanism 1115 (e.g., sliding crimpers 1110 and 1120, etc.) that is illustrated in a stress applying position in FIG. 11B. In one example, the stress mechanism 1115 includes sliding crimpers 1110 and 1120 that slide in directions 1112, 1122 and apply a stress (e.g., a force) to an early stage plant 1181 (e.g., V2 second trifoliolate, V4, R2, etc.) in a row 1180. The stress mechanism may apply a force to the plants to cause growth of additional nodes. In one example, the stress mechanism 1115 applies stress to a stalk of the plant 1181 above cotyledon leaves 1182 and below trifoliolate leaves 1183.

Figure 12:
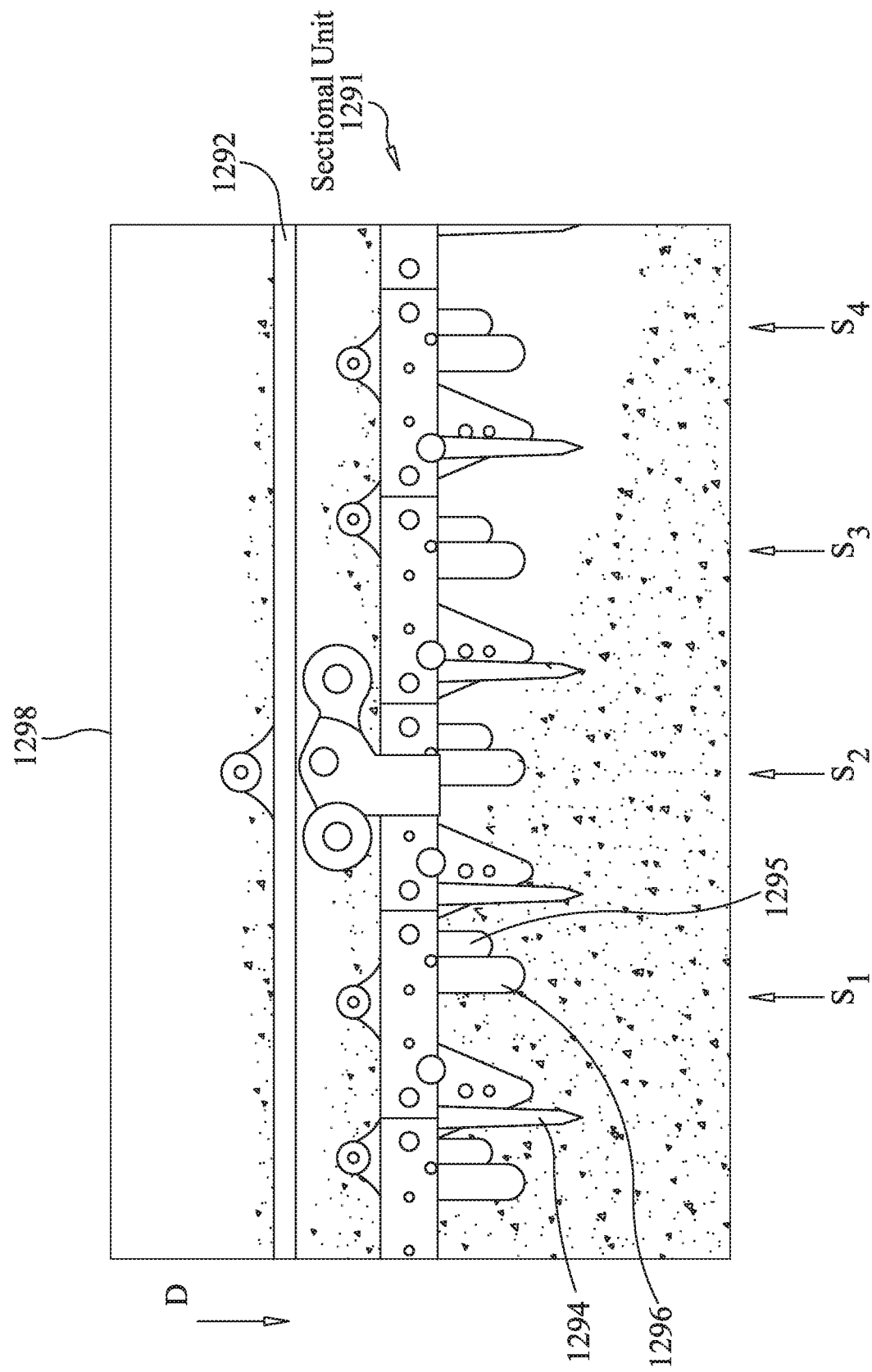
FIG. 12 illustrates a top view 1298 of a sectional unit for applying a stress to rows of plants (e.g., soybean plants S1, S2, S3, S4, etc.) in accordance with one embodiment.

FIG. 12 illustrates a top view 1298 of a sectional unit for applying a stress to rows of plants (e.g., soybean plants S1, S2, S3, S4, etc.) in accordance with one embodiment. It should be appreciated that a sectional unit 1291 is illustrated traveling in a direction D. The sectional unit 1291 (e.g., sickle unit) is preferably mounted to a transversely extending frame 1292 (e.g., toolbar or boom, sidedress bar, etc.) drawn by a tractor or other implement. The sectional unit 1291 includes a first member 1294 (e.g., spiked members) and stress mechanisms 1295, 1296 (e.g., at least one acting member, crimper, etc.). In one example, the stress mechanisms apply a stress (e.g., a force) to the early stage plants (e.g., V2 second trifoliolate, V4, R2, etc.). The stress mechanism may apply a force (e.g., cutting mechanism, etc.) to the plants to cause growth of additional nodes. In one example, the stress mechanisms may have an adjustable position (e.g., height) above the ground depending on a height of the plants. The stress mechanisms may be positioned at a height above the ground based on sensed data from a proximity sensor which senses a distance from the sensor to the ground or a distance from the sensor to the plants.

Figure 13A:
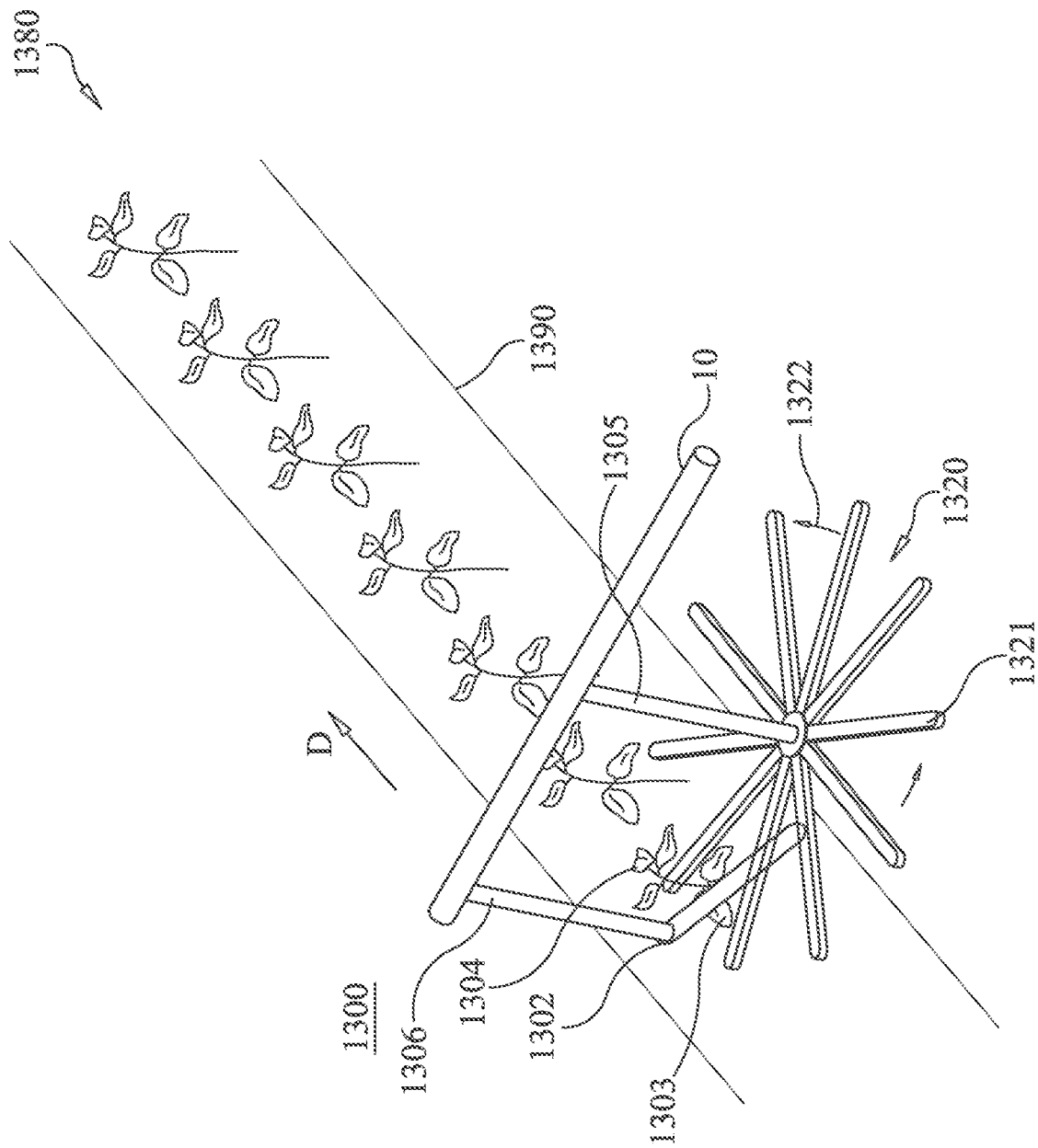
FIG. 13A illustrates an isometric view of a row unit for applying stress to a row of plants (e.g., soybean plants, corn plants, etc.) in accordance with one embodiment.

FIG. 13A illustrates an isometric view of a row unit for applying stress to a row of plants (e.g., soybean plants, corn plants, etc.) in accordance with one embodiment. The row unit 1300 is preferably mounted to a transversely extending frame 10. The plant contacting bar 1302 can be mounted or coupled to the frame 10 (e.g., toolbar or boom, sidedress bar, etc.) of FIG. 2 drawn by a tractor or other implement. The bar 1302 may be positioned above cotyledon leaves 1303 and below trifoliolate leaves 1304 in one example in order to apply the stress mechanism above cotyledon leaves of the soybean plant. If the stress mechanism is applied below the cotyledon leaves, then the stalk or stem of the soybean plant may break thus killing the plant. This bar 1302 can have an adjustable height above the ground surface 1390 depending on a height of cotyledon leaves of the soybean plants.

The row unit 1300 includes a rotating member 1320 having at least one or plurality of rotating blades 1321 that rotate with a direction 1322 in a substantially horizontal plane (e.g., +/−30 degrees with respect to a horizontal plane) that is positioned slightly above the bar 1302 at a crimping region for applying a stress mechanism. Rotating member 1320 is connected to the frame 10 through connecting arm 1305. The bar 1302 is also positioned in a substantially horizontal plane (e.g., +/−30 degrees with respect to a horizontal plane). Bar 1302 is connected to the frame 10 through connecting arm 1306. The rotation direction is in opposition to a direction of travel D. The rotating member and bar 1302 in combination form a stress mechanism for applying a stress (e.g., a force) to the early stage plants (e.g., V2 second trifoliolate, V4, R2, etc.) in a row 1380. This stress mechanism causes growth of additional nodes.

In one example, the rotating member has a rotation frequency of 5-200 Hz. The rotating member has a threshold frequency (e.g., greater than 80 Hz) that is necessary for crimping a soybean plant as the row unit travels through a field at a certain speed (e.g., 5-15 mph).

Figure 13B:
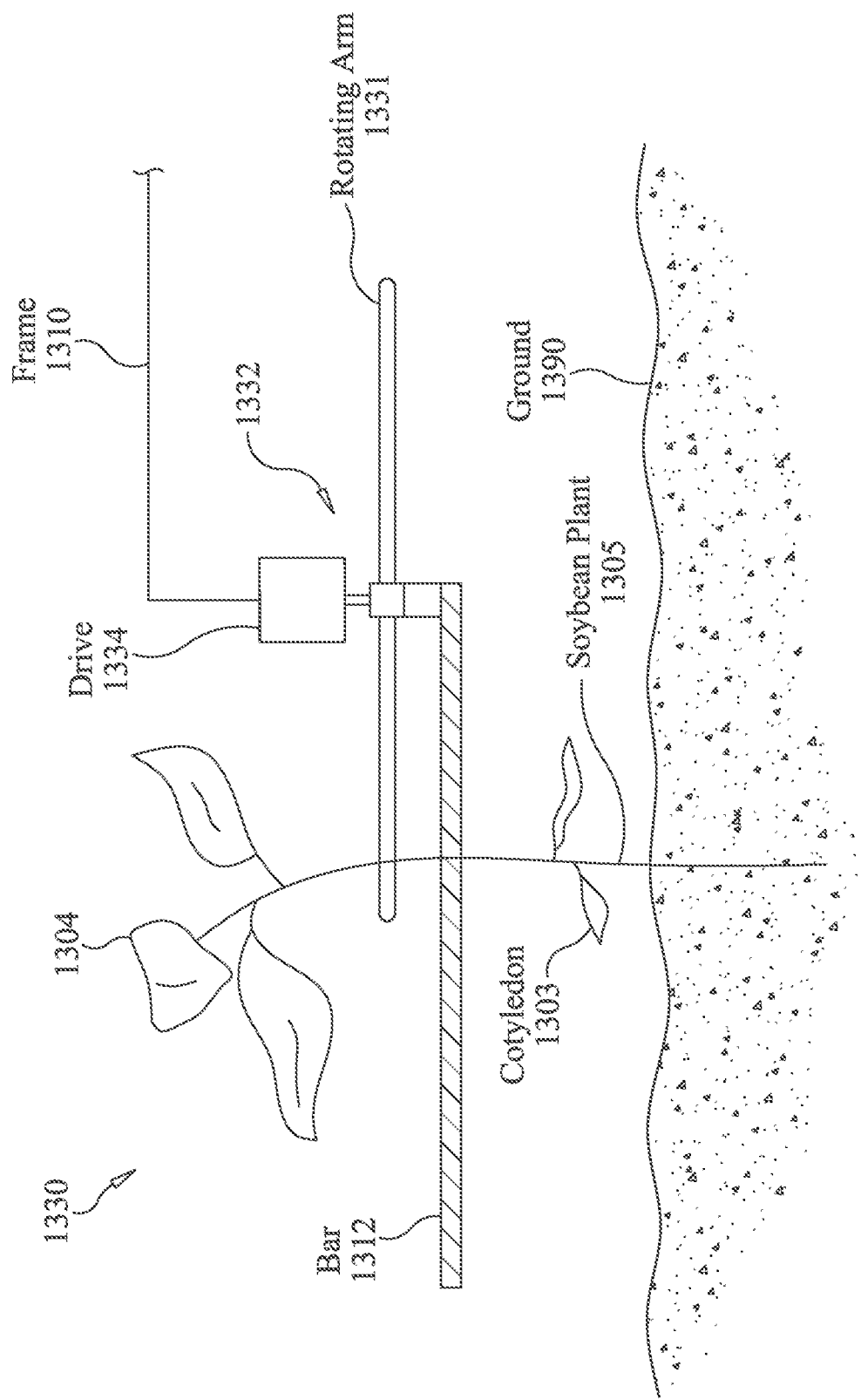
FIG. 13B FIG. 13B illustrates a side view of a row unit for applying stress to a row of plants (e.g., soybean plants, corn plants, etc.) in accordance with one embodiment.

FIG. 13B illustrates a side view of a row unit for applying stress to a row of plants (e.g., soybean plants, corn plants, etc.) in accordance with one embodiment. A frame 1310 of the row unit 1330 is preferably mounted to a transversely extending bar (e.g., frame 10 of FIG. 2, tool bar of any tractor or implement). The bar 1310 may be positioned above cotyledon leaves 1303 and below trifoliolate leaves 1304 in one example in order to apply the stress mechanism above cotyledon leaves of the soybean plant. This bar 1312 can have an adjustable height above the ground surface 1390 depending on a height of cotyledon leaves of the soybean plants. Bars 1302 and 1312 can be connected to frame 10 separately, or bars 1302 and 1312 can be connected to rotating member 1320 or rotating member 1332.

The row unit 1330 includes a drive 1334 for driving a rotating member 1332 having a plurality of rotating arms (i.e., blades) 1331 that rotate in a substantially horizontal plane (e.g., +/−30 degrees with respect to a horizontal plane) that is positioned slightly above the bar 1312 at a crimping region of the soybean plant. The bar 1312 is also positioned in a substantially horizontal plane (e.g., +/−30 degrees with respect to a horizontal plane). The rotation direction may be in opposition to a direction of travel. The rotating member and bar 1312 in combination form a stress mechanism for applying a stress (e.g., a force) to the early stage plants (e.g., V2 second trifoliolate, V4, R2, etc.) in a row 1380. This stress mechanism causes growth of additional nodes.

Figures 13C, 13D:
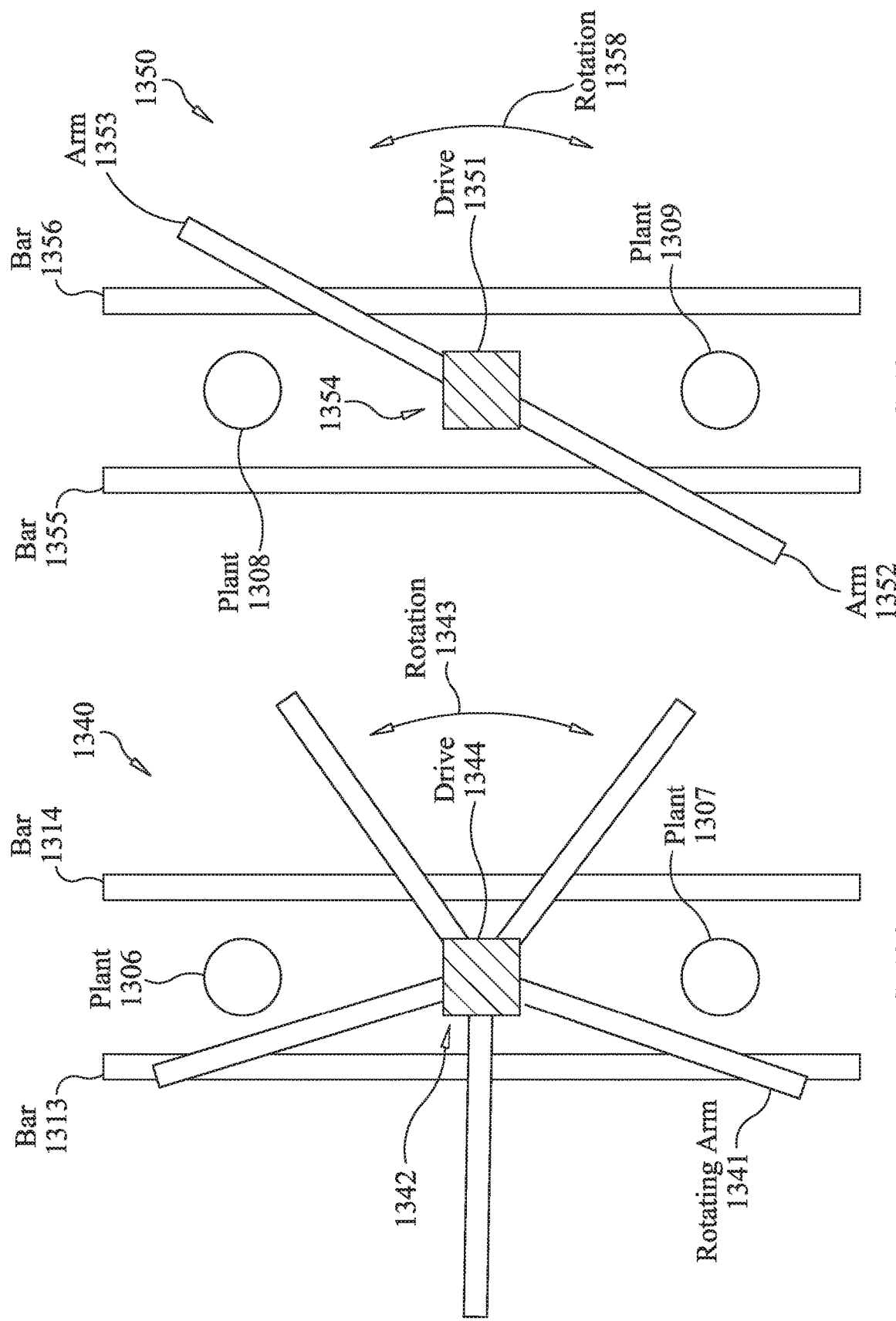
FIG. 13C illustrates a top view of a row unit for applying stress to a row of plants (e.g., soybean plants, corn plants, etc.) in accordance with one embodiment.
FIG. 13D illustrates a top view of a row unit for applying stress to a row of plants (e.g., soybean plants, corn plants, etc.) in accordance with one embodiment.

FIG. 13C illustrates a top view of a row unit for applying stress to a row of plants (e.g., soybean plants, corn plants, etc.) in accordance with one embodiment. The row unit 1340 is preferably mounted to a transversely extending bar (e.g., frame 10 of FIG. 2, tool bar of any tractor or implement). The bars 1313 and 1314 may be positioned above cotyledon leaves of the plants 1306 and 1307 and below trifoliolate leaves of these plants in one example in order to apply the stress mechanism above cotyledon leaves of the soybean plants. These bars 1313 and 1314 can have an adjustable height above the ground surface depending on a height of cotyledon leaves of the soybean plants.

The row unit 1340 includes a drive 1344 for driving a rotating member 1342 having a plurality of rotating arms (i.e., blades) 1341 that rotate in a substantially horizontal plane (e.g., +/−30 degrees with respect to a horizontal plane) that is positioned slightly above the bars 1313 and 1314 at a crimping region of the soybean plants. The bars 1313 and 1314 are also positioned in a substantially horizontal plane (e.g., +/−30 degrees with respect to a horizontal plane) with at least an upper or top region of the bars, which is visible in FIG. 13C, being positioned at least slightly above (e.g., 0-2 inches) the cotyledon leaves of the plants 1313 and 1314. The rotation direction 1343 may be either clockwise or counterclockwise regardless of a direction of travel. The bars 1313 and 1314 provide a stopping mechanism such that when the rotating member passes a plant a rotation of trailing arms (blades) has a stopping mechanism as well. The rotating member and bars 1313 and 1314 in combination form a stress mechanism for applying a stress (e.g., a force) to the early stage plants (e.g., V2 second trifoliolate, V4, R2, etc.). This stress mechanism causes growth of additional nodes.

FIG. 13D illustrates a top view of a row unit for applying stress to a row of plants (e.g., soybean plants, corn plants, etc.) in accordance with one embodiment. The row unit 1350 is preferably mounted to a transversely extending bar (e.g., frame 10 of FIG. 2, tool bar of any tractor or implement). The bars 1355 and 1356 may be positioned above cotyledon leaves of the plants 1308 and 1309 and below trifoliolate leaves of these plants in one example in order to apply the stress mechanism above cotyledon leaves of the soybean plants. These bars 1355 and 1356 can have an adjustable height above the ground surface depending on a height of cotyledon leaves of the soybean plants.

The row unit 1350 includes a drive 1351 for driving a rotating member 1354 having a plurality of rotating arms (i.e., blades) 1352 and 1353 that rotate in a substantially horizontal plane (e.g., +/−30 degrees with respect to a horizontal plane) that is positioned slightly above the bars 1355 and 1356 at a crimping region of the soybean plants. The bars 1355 and 1356 are also positioned in a substantially horizontal plane (e.g., +/−30 degrees with respect to a horizontal plane) with at least an upper or top region of the bars, which is visible in FIG. 13D, being positioned at least slightly above (e.g., 0-2 inches) the cotyledon leaves of the plants 1308 and 1309. The rotation direction 1358 may be either clockwise or counterclockwise regardless of a direction of travel. The bars 1355 and 1356 provide a stopping mechanism such that when the rotating member passes a plant a rotation of trailing arms (blades) has a stopping mechanism as well. The rotating member and bars 1355 and 1356 in combination form a stress mechanism for applying a stress (e.g., a force) to the early stage plants (e.g., V2 second trifoliolate, V4, R2, etc.). This stress mechanism causes growth of additional nodes.

In one example, the bars 1355 and 1356 each have a greater length than a furthest extension of the arms 1352 and 1353. The rotating member 1354 is illustrated with 2 arms in FIG. 13D. In other embodiments, the rotating member 1354 includes at least one arm (e.g., 1 arm, 2 arms, 3 arms, 4 arms, 5 arms, 6 arms, etc.). Additional arms will allow the row unit 1350 to travel faster and ensure that each soybean plant is contacted with at least one arm of the rotating member 1354.

Figure 13E:
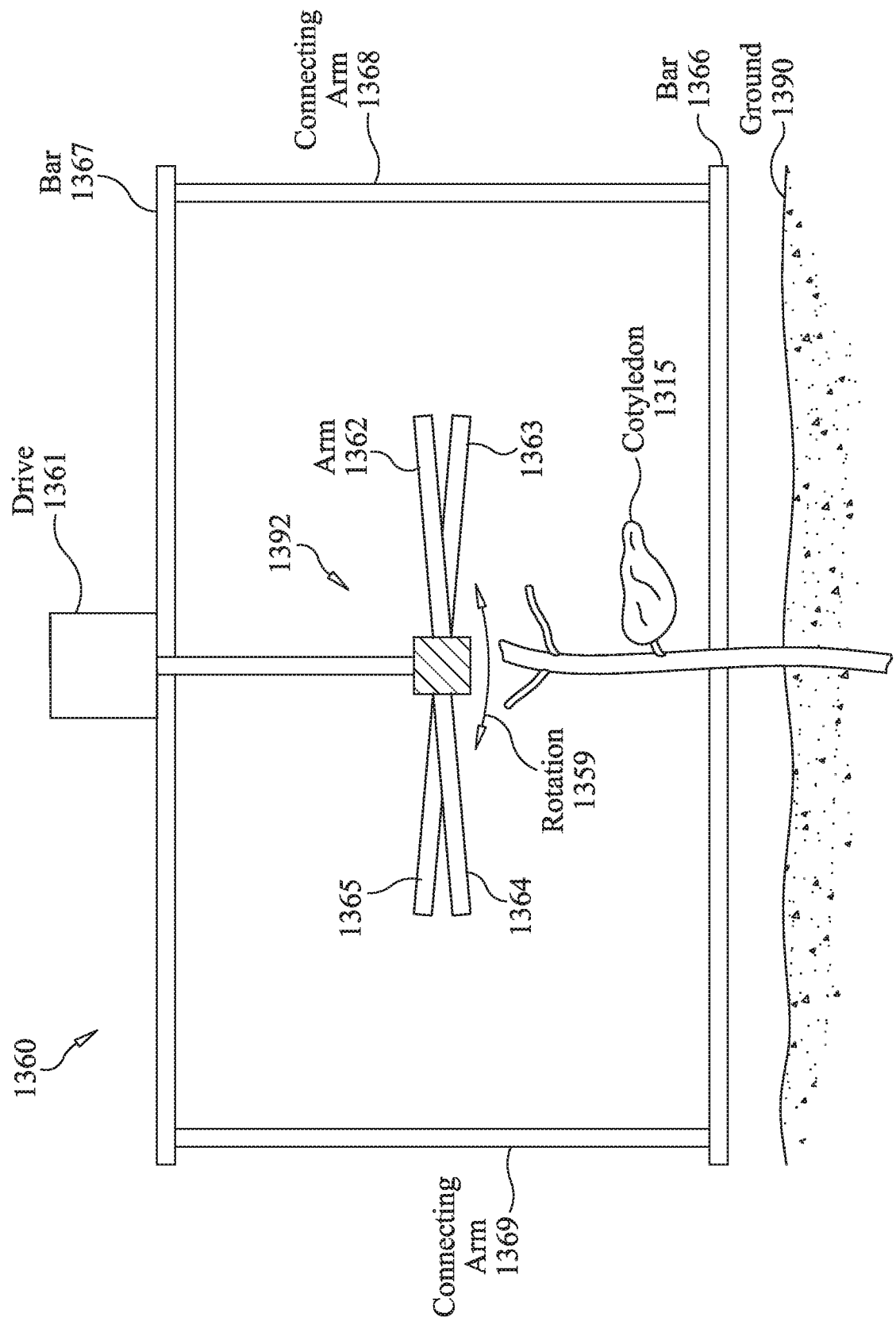
FIG. 13E illustrates a side view of a row unit for applying stress to a row of plants (e.g., soybean plants, corn plants, etc.) in accordance with one embodiment.

FIG. 13E illustrates a side view of a row unit for applying stress to a row of plants (e.g., soybean plants, corn plants, etc.) in accordance with one embodiment. The row unit 1360 is preferably mounted to a transversely extending bar (e.g., frame 10 of FIG. 2, tool bar of any tractor or implement). The bar 1367 may be positioned above cotyledon leaves 1315 of a soybean plants and below trifoliolate leaves of the plant in one example in order to apply the stress mechanism above cotyledon leaves of the soybean plants. The bars 1367 and 1366 can have an adjustable height above the ground surface 1390 depending on a height of cotyledon leaves of the soybean plants. The bars 1367 and 1366 are each coupled to connecting arms 1368 and 1369.

The row unit 1360 includes a drive 1361 for driving a rotating member 1392 having a plurality of rotating arms (i.e., blades) 1362-1365 that rotate in a substantially horizontal plane (e.g., +/−30 degrees with respect to a horizontal plane) that is positioned slightly above the bars 1355 and 1356 at a crimping region of the soybean plants. The bars 1366 and 1367 are also positioned in a substantially horizontal plane (e.g., +/−30 degrees with respect to a horizontal plane) with at least bar 1367 being positioned at least slightly above (e.g., 0-2 inches) the cotyledon leaves of the plant. The rotation direction 1359 may be either clockwise or counterclockwise regardless of a direction of travel. The rotating member and bar 1366 in combination form a stress mechanism for applying a stress (e.g., a force) to the early stage plants (e.g., V2 second trifoliolate, V4, R2, etc.). This stress mechanism causes growth of additional nodes.

Figure 13F:
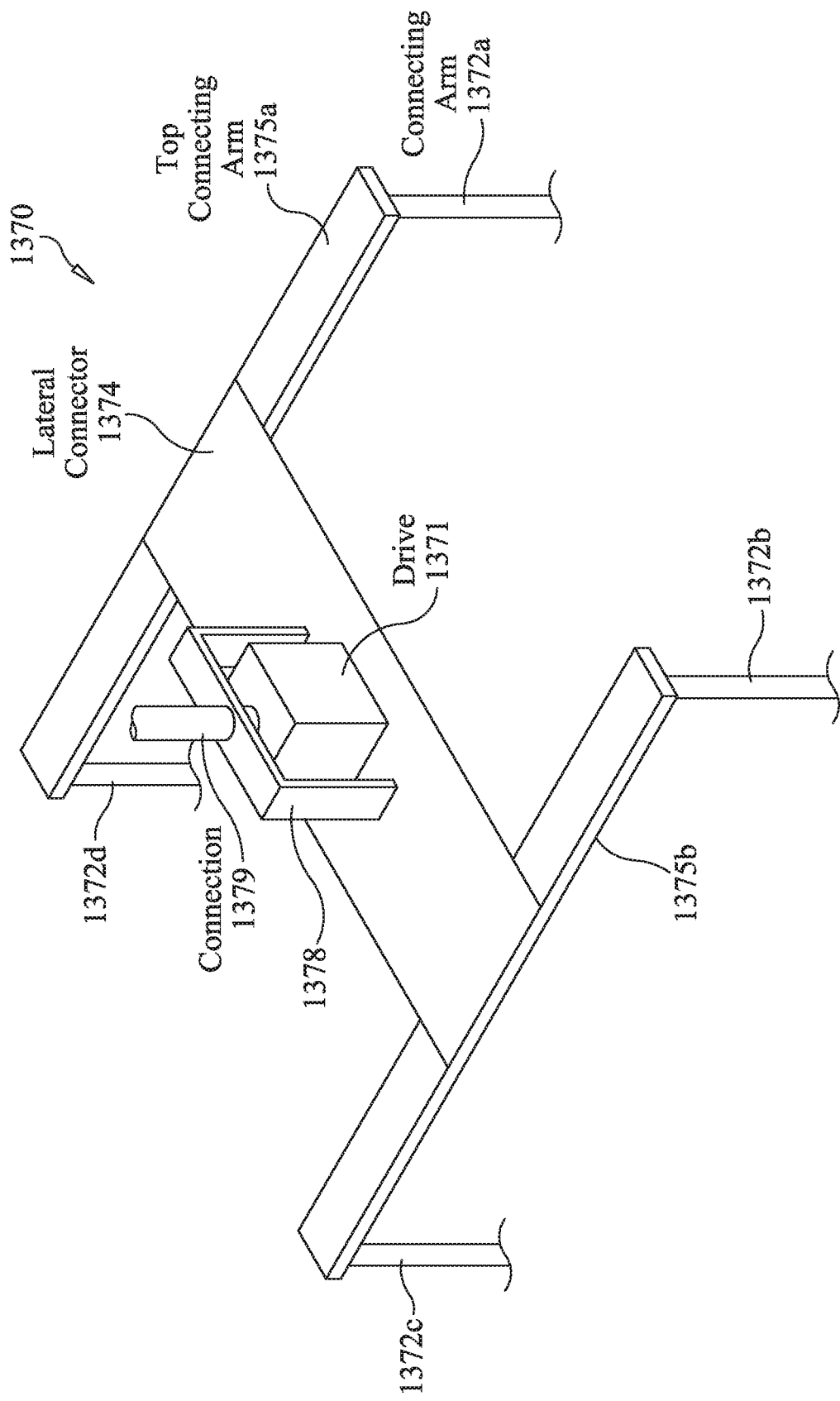
FIG. 13F illustrates a connecting mechanism for connecting a stressing mechanism to a frame 10 in accordance with one embodiment.

FIG. 13F illustrates a connecting mechanism for connecting a row unit to a frame 10 in accordance with one embodiment. The connecting mechanism 1370 is preferably adjustable such that any of the row units (e.g., row units 210-217, 1300, 1330, 1340, 1350, 1360, etc.) having rotating members of any of the embodiments disclosed herein may be mounted to any bar (e.g., frame 10) having variable size and cross-sectional shape. In the illustrated embodiment, the connecting mechanism 1370 includes connector arms 1372a-d that are connected to at least one bar (e.g., stopping mechanism, bars 1302, 1312, 1313, 1314, 1355, 1356, 1366, etc.), top connecting arms 1375a-b, a lateral connector 1374, member 1378 (e.g., U-shaped member), and a connection 1379 to a bar (e.g., frame 10, tool bar of tractor or implement). A drive 1371 for driving a rotating member may be fixed to the lateral connector 1374 by any coupling structure known in the art.

Figure 14:
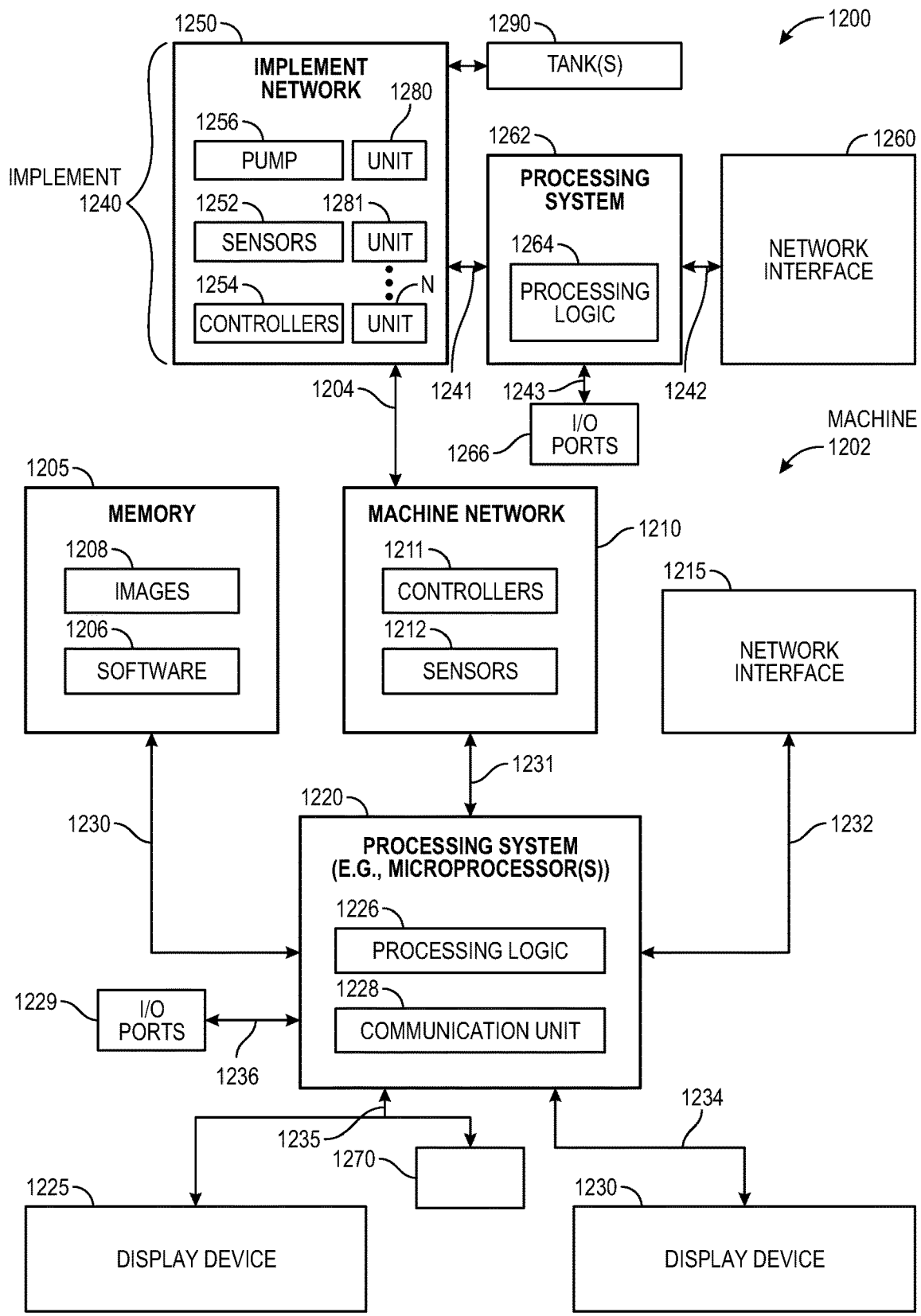
FIG. 14 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment.

FIG. 14 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors) and controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 14. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for liquid applications of a field. The flow rate of a liquid application for each row unit of the implement can be associated with locational data at time of application to have a better understanding of the applied liquid for each row and region of a field. Data associated with the liquid applications can be displayed on at least one of the display devices 1225 and 1230.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors may process the communications received from the communication unit 1228 including agricultural data (e.g., GPS data, liquid application data, flow rates, etc.). The system 1200 includes memory 1205 for storing data and programs for execution (software 1206) by the processing system. The memory 1205 can store, for example, software components such as stress application software for applying stress to plants, liquid application software for analysis of liquid applications for performing operations of the present disclosure, or any other software application or module, images (e.g., captured images of crops), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, row unit 1280, display device 1230, display device 1225, and I/O ports 1229 via communication links 1231-1236, respectively.

Display devices 1225 and 1230 can provide visual user interfaces for a user or operator. The display devices may include display controllers. In one embodiment, the display device 1225 is a portable tablet device or computing device with a touchscreen that displays data (e.g., stress application data (e.g., georeferenced data, downforce data, etc.), liquid application data, captured images, localized view map layer, high definition field maps of as-applied liquid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied stress data, as-applied liquid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g, a controller area network (CAN) serial bus protocol network, an ISOBUS network, etc.) includes a pump 1256 for pumping liquid from a storage tank(s) 1290 to row units 1280, 1281, . . . N of the implement, sensors 1252 (e.g., speed sensors, seed sensors for detecting passage of seed, downforce sensors, actuator valves, moisture sensors or flow sensors for a combine, speed sensors for the machine, seed force sensors for a planter, applied stress sensors for positioning of a stress mechanism with respect to the ground or with respect to plants, liquid application sensors for a sprayer, or vacuum, lift, lower sensors for an implement, flow sensors, etc.), controllers 1254 (e.g., GPS receiver), and the processing system 1262 for controlling and monitoring operations of the implement. The row units may each include a stress mechanism for applying stress to the plants. The pump controls and monitors the application of the liquid to crops or soil as applied by the implement. The stress application can be applied at any appropriate stage of plant development to promote plant growth. The liquid application can be applied at any stage of crop development including within a planting trench upon planting of seeds, adjacent to a planting trench in a separate trench, or in a region that is nearby to the planting region (e.g., between rows of corn or soybeans) having seeds or crop growth.

For example, the controllers may include processors in communication with a plurality of seed sensors. The processors are configured to process data (e.g., stress application data, liquid application data, seed sensor data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 12.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the networks interfaces 1215 and 1260. The implement may also by physically coupled to the machine for agricultural operations (e.g., planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to performs operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Where reference is made to a liquid as to any of the various embodiments disclosed herein, it should be appreciated that any fluid may be similarly transferred and applied by such embodiments; e.g., in a liquid, gaseous, dense phase or transitional phase.

For each of the row unit embodiments described herein, multiple units are preferably disposed along the length of the bar, e.g., such that one, two or more rows of plants are disposed beneath each unit.

Figure 15:
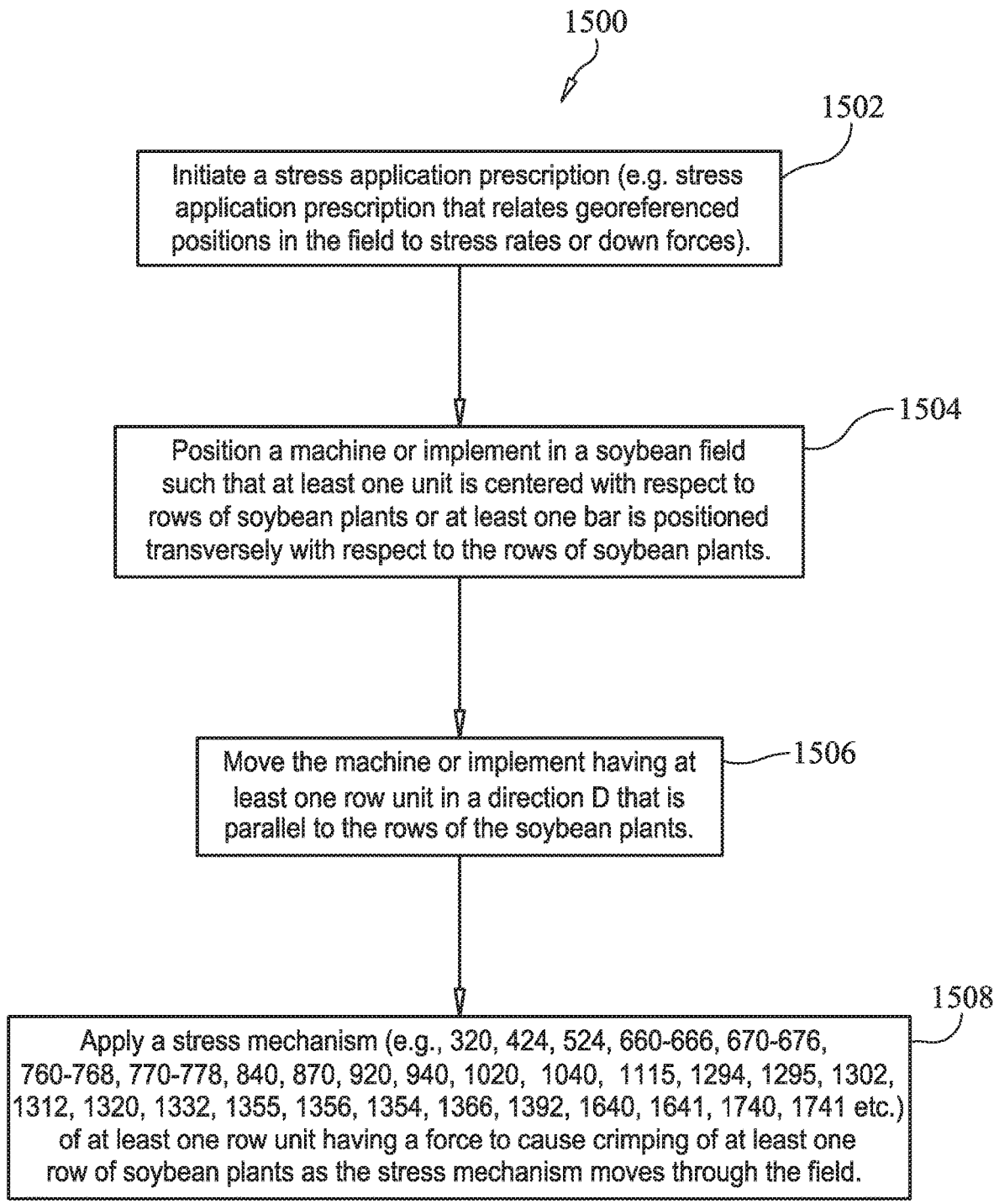
FIG. 15 illustrates a flow diagram of one embodiment for a method 1500 of applying stress to rows of agricultural plants in accordance with one embodiment.

FIG. 15 illustrates a flow diagram of one embodiment for a method 1500 of applying stress to rows of agricultural plants in accordance with one embodiment. The method 1500 is performed by processing logic that may comprise hardware (circuitry, dedicated logic, etc.), software (such as is run on a general purpose computer system or a dedicated machine or a device), or a combination of both. In one embodiment, the method 1500 is performed by processing logic of at least one of a data processing system (e.g., system 132, system 1262, system 1220), a row unit, a machine, and an implement. The system or device executes instructions of a software application or program with processing logic. The software application or program can be initiated by a system or may notify an operator or user of a machine (e.g., tractor, planter, combine) depending on operating conditions while applying stress to rows of plants.

At block 1502, a stress application prescription (e.g., stress application prescription that relates georeferenced positions in the field to stress rates or down forces) is initiated by an operator of a machine or an implement. At block 1504, the machine or implement is positioned in a field such that a frame or at least one row unit (e.g., a plurality of row units of an implement) is centered with respect to rows of plants or at least one bar is positioned transversely with respect to the rows of plants. In one example, the frame is positioned or the row units are positioned above rows of early stage plants. In another example, the row units are replaced with the frame that is positioned in a substantially horizontal plane with respect to the ground and also transversely positioned with respect to the rows of the plants.

At block 1506, the machine or implement having the frame or at least one row unit proceeds to move in a direction D that is parallel to the rows of the plants. At block 1508, a stress mechanism (e.g., 320, 424, 524, 660-666, 670-676, 760-768, 770-778, 840, 870, 920, 940, 1020, 1040, 1115, 1294, 1295, 1302, 1312, 1320, 1332, 1355, 1356, 1354, 1366, 1392, 1640, 1641, 1740, 1741, 1915, 2010, 2020, etc.) of a frame or at least one row unit moves with the machine or implement and applies a force to at least one row of plants as the stress mechanism moves through the field. The stress applied to the rows of plants causes growth of additional nodes of the plants. In one example, the stress mechanisms apply a stress (e.g., a force) to the early stage plants (e.g., V2 second trifoliolate, V4, R2, etc.).

In some embodiments, the operations of the method(s) disclosed herein can be altered, modified, combined, or deleted. The methods in embodiments of the present invention may be performed with a device, an apparatus, or data processing system as described herein. The device, apparatus, or data processing system may be a conventional, general-purpose computer system or special purpose computers, which are designed or programmed to perform only one function, may also be used.

Figure 16:
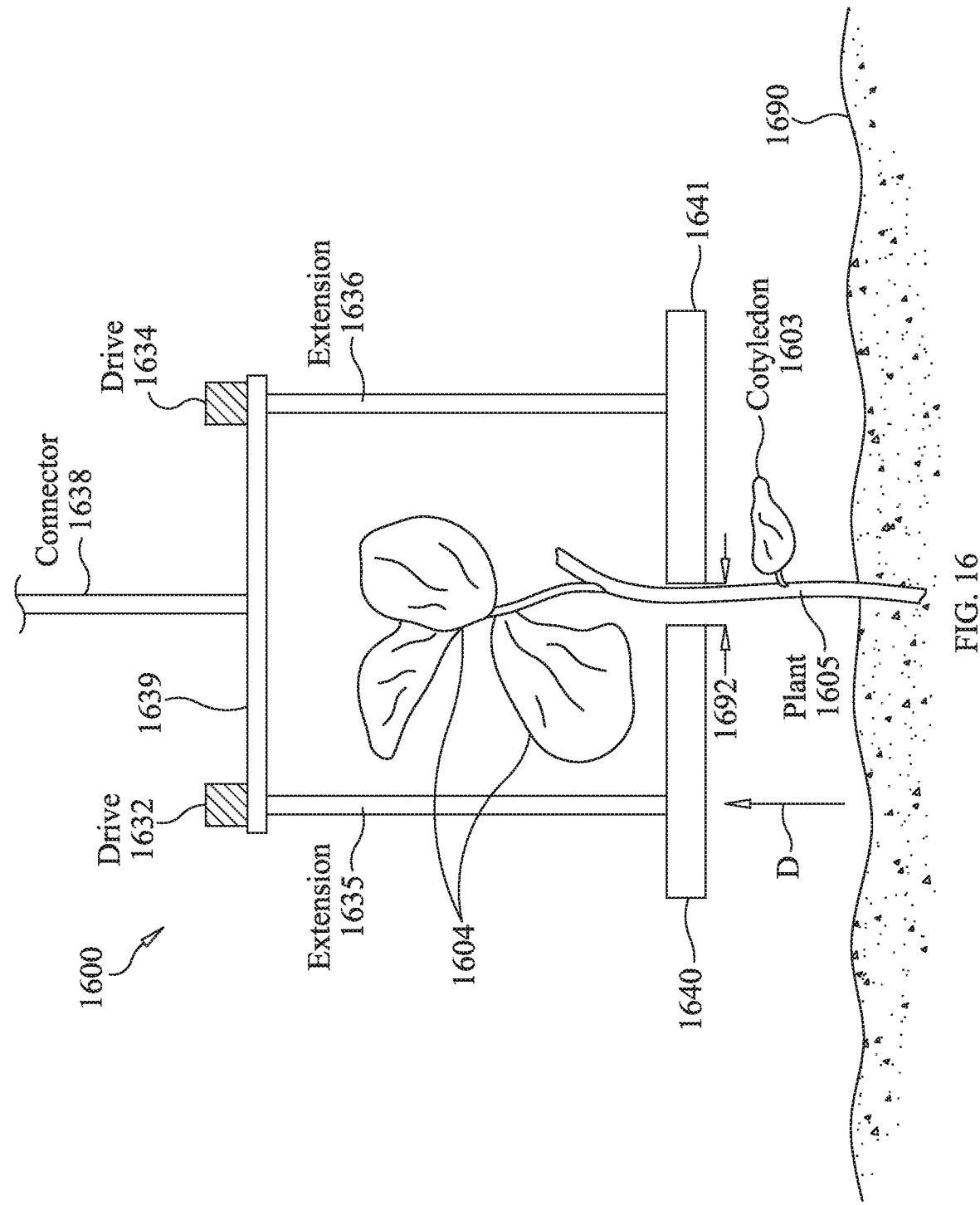
FIG. 16 illustrates a side view of a row unit for applying stress to a row of plants (e.g., soybean plants, corn plants, etc.) in accordance with one embodiment.

FIG. 16 illustrates a side view of a row unit for applying stress to a row of plants (e.g., soybean plants, corn plants, etc.) in accordance with one embodiment. The row unit 1600 includes a connector 1638 to be preferably mounted to a transversely extending bar (e.g., frame 10 of FIG. 2, tool bar of any tractor or implement). A lateral connector 1639 is coupled to the connector 1638. The lateral connector 1639 supports drives 1632 and 1634, which are coupled to extensions 1635 and 1636, respectively, for causing rotating members 1640 and 1641 (e.g., wheels), respectively to rotate in opposite directions. For example, the rotating member 1640 can rotate in a clockwise direction and the rotating member 1641 can rotate in a counterclockwise direction in a substantially horizontal plane (e.g., +/−30 degrees with respect to a horizontal plane) above the ground surface 1690. Alternatively, the rotating member 1641 can rotate in a clockwise direction and the rotating member 1640 can rotate in a counterclockwise direction.

The rotating members 1640 and 1641 may be positioned at a height above a ground surface 1690 and also slightly above cotyledon leaves 1603 of a soybean plant 1650 and below trifoliolate leaves 1604 of the plant in one example and have a spacing 1692 (e.g., a gap, a 0.2-1 inch spacing, etc.) between the rotating members to accept the plant and a rigidity in order to apply the stress mechanism (e.g., crimping pressure, pinching pressure) above the cotyledon leaves of the soybean plants. The rotating members 1640 and 1641 can have an adjustable height above the ground surface 1690 depending on a height of cotyledon leaves of the soybean plants. The extensions 1635 and 1636 may have an adjustable length to provide an adjustable height of the rotating members.

Figure 17:
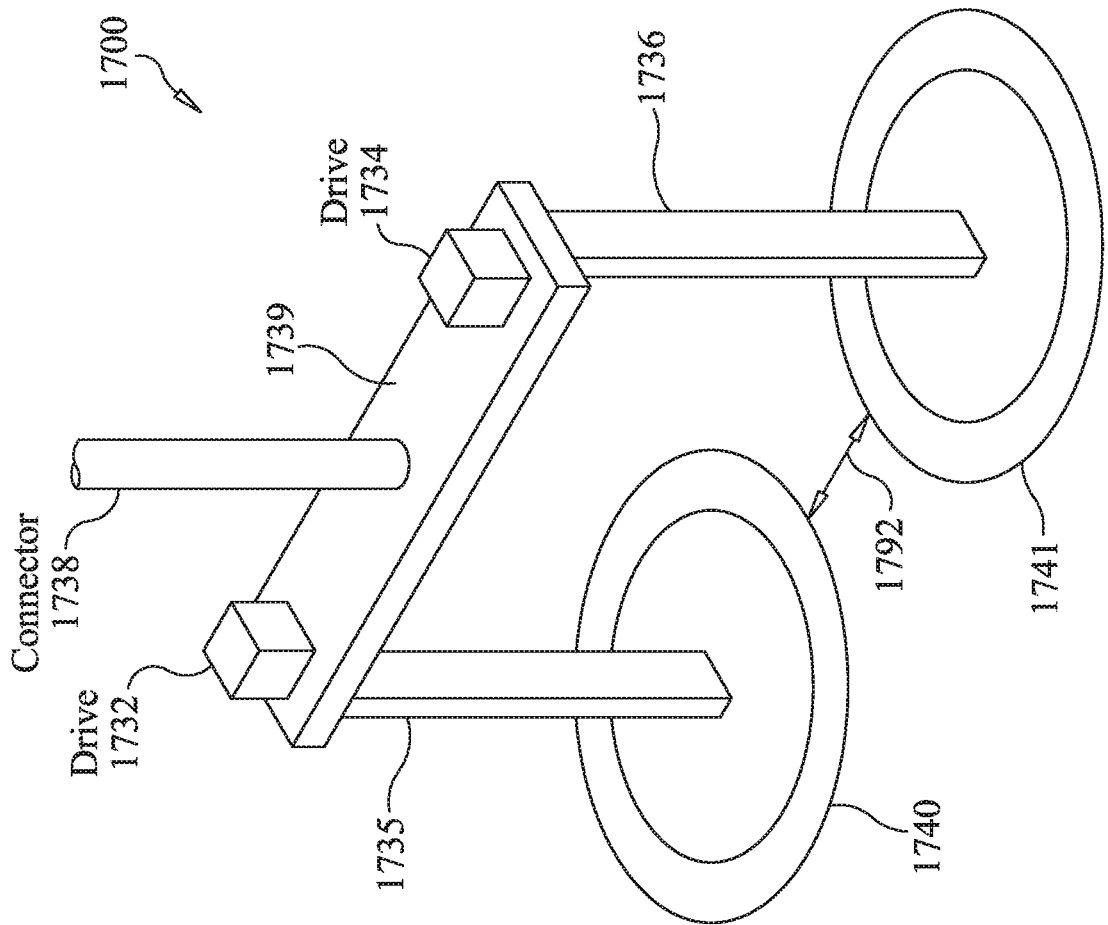
FIG. 17 illustrates an isometric view of a row unit for applying stress to a row of plants (e.g., soybean plants, corn plants, etc.) in accordance with one embodiment.

FIG. 17 illustrates an isometric view of a row unit for applying stress to a row of plants (e.g., soybean plants, corn plants, etc.) in accordance with one embodiment. The row unit 1700 includes a connector 1738 to be preferably mounted to a transversely extending bar (e.g., frame 10 of FIG. 2, tool bar of any tractor or implement). A lateral connector 1739 is coupled to the connector 1738. The lateral connector 1739 supports drives 1732 and 1734, which are coupled to extensions 1735 and 1736, respectively, for causing rotating members 1740 and 1741 (e.g., wheels), respectively to rotate in opposite directions. For example, the rotating member 1740 can rotate in a clockwise direction and the rotating member 1741 can rotate in a counterclockwise direction in a substantially horizontal plane (e.g., +/−30 degrees with respect to a horizontal plane) above a ground surface. Alternatively, the rotating member 1741 can rotate in a clockwise direction and the rotating member 1740 can rotate in a counterclockwise direction.

The rotating members 1740 and 1741 may be positioned at a height above a ground surface 1790 and also slightly above cotyledon leaves of a soybean plant and below trifoliolate leaves of the plant in one example and have a spacing 1792 (e.g., a gap, a 0.2-1 inch spacing, etc.) between the rotating members to accept the plant and a rigidity in order to apply the stress mechanism (e.g., crimping pressure, pinching pressure) above the cotyledon leaves of the soybean plants. The rotating members 1740 and 1741 can have an adjustable height above the ground surface depending on a height of cotyledon leaves of the soybean plants. The extensions 1735 and 1736 may have an adjustable length to provide an adjustable height of the rotating members.

Figure 18:
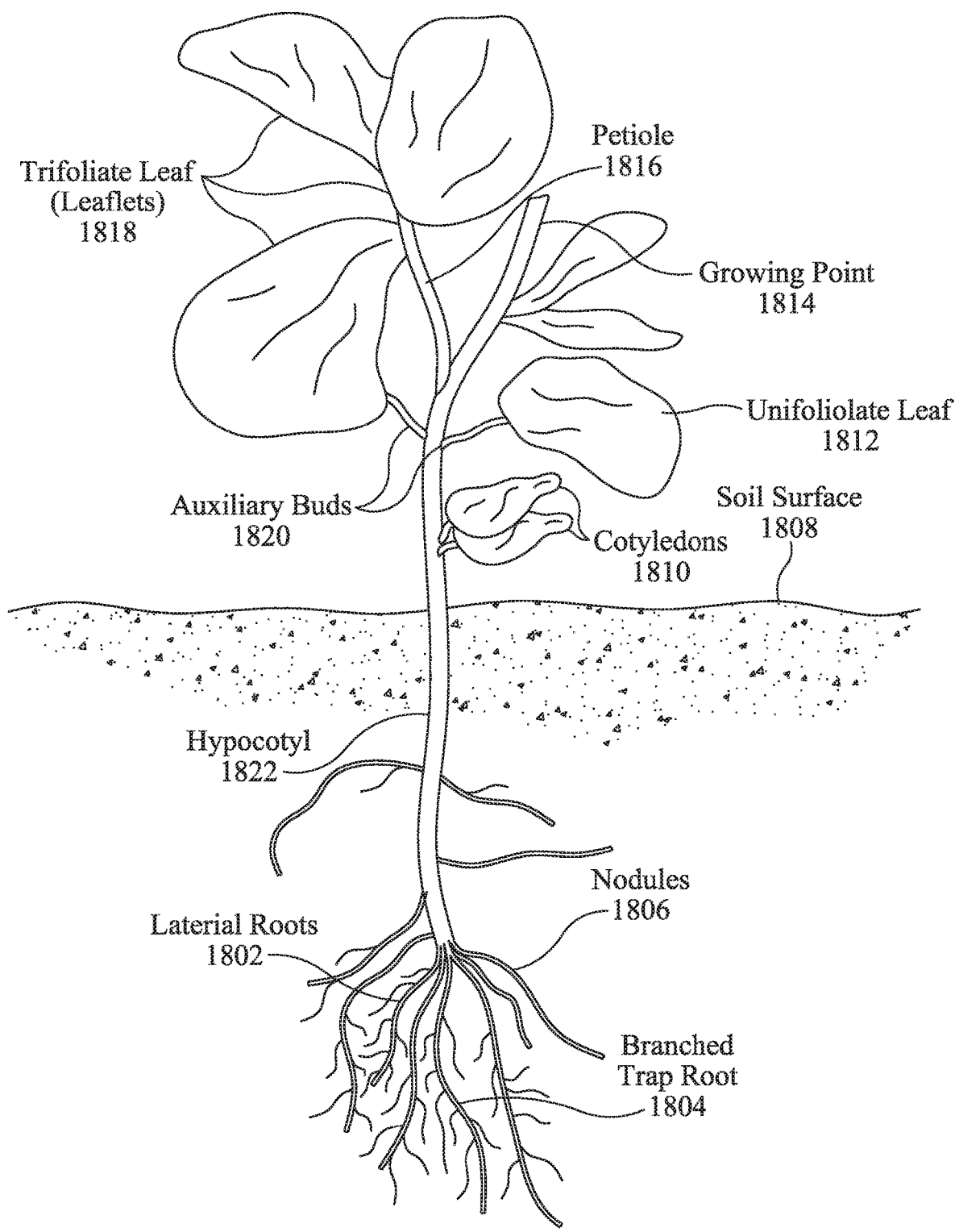
FIG. 18 illustrates an early growth stage of a soybean plant in accordance with one embodiment.

FIG. 18 illustrates an early growth stage of a soybean plant in accordance with one embodiment. The soybean plant includes a hypocotyl 1822, laterial roots 1802, nodules 1806, and branched trap root 1804 below a soil surface 1808. The soybean plant includes cotyledons 1810, auxiliary buds 1820, unifoliolate leaf 1812, growing point 1814, petiole 1816, and trifoliate leaf 1818 with three leaflets above the soil surface. The stress mechanisms described herein are applied above the cotyledons 1810 and below the trifoliate leaf 1818 in order to stimulate additional growth nodes and improve yield of the soybean plants.

Figure 19A:
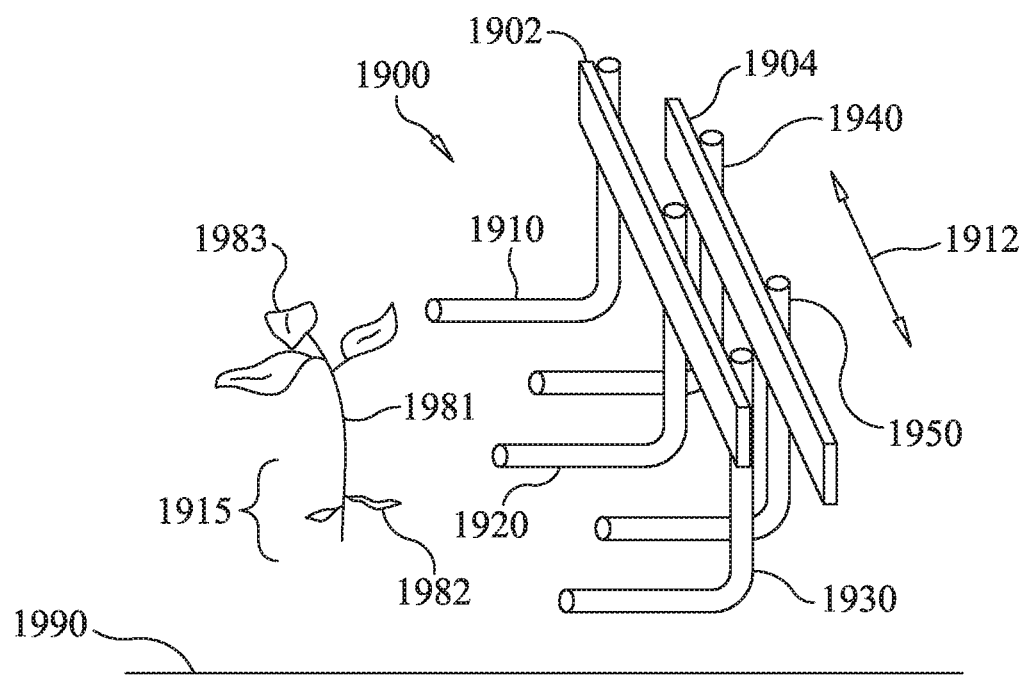
FIG. 19A illustrates an isometric view of a row unit for applying stress to a row of plants (e.g., soybean plants, corn plants, etc.) in accordance with one embodiment.

FIG. 19A illustrates an isometric view of a row unit for applying stress to a row of plants (e.g., soybean plants, corn plants, etc.) in accordance with one embodiment. The row unit 1900 is preferably mounted to transversely extending support bars 1902 and 1904 that can be mounted or coupled to a frame 10 (e.g., toolbar or boom, sidedress bar, etc.) drawn by a tractor or other implement. Alternatively, the row unit 1900 is coupled or attached to the frame 10. The row unit preferably extends laterally above existing soybean plants as the support bars 1902 and 1904 traverse the field having a ground surface 1990. The bars 1902 and 1904 may be positioned above the soybean plants and can have an adjustable height above the ground surface 1990 depending on a height of the soybean plants. The bars 1902 and 1904 are positioned in proximity to each other and can contact each other or have a small spacing or gap between each other.

The row unit 1900 includes a stress mechanism 1915 (e.g., sliding or oscillating crimpers or acting members 1910, 1920, 1930, 1940, 1950, etc.) that is illustrated as acting members 1920 and 1950 in FIG. 19A. However, any adjacent pair of crimpers or acting members can be a stress mechanism for applying stress to a soybean plant 1981. In one example, the stress mechanism 1915 includes sliding crimpers or acting members 1920 and 1950 that slide or oscillate in direction 1912 and apply a stress (e.g., a force) above a cotyledon leaf 1982 and below trifoliolate leaves 1983 of the soybean plant 1981 (e.g., V2 second trifoliolate, V4, R2, etc.) in a row of soybean plants. The stress mechanism may apply a force to the plants to cause growth of additional nodes. In one example, at least one of the bars 1902 and 1904 oscillates and moves and thus causes the acting members coupled or integrated with the at least bar to oscillate and move.

Figure 19B:
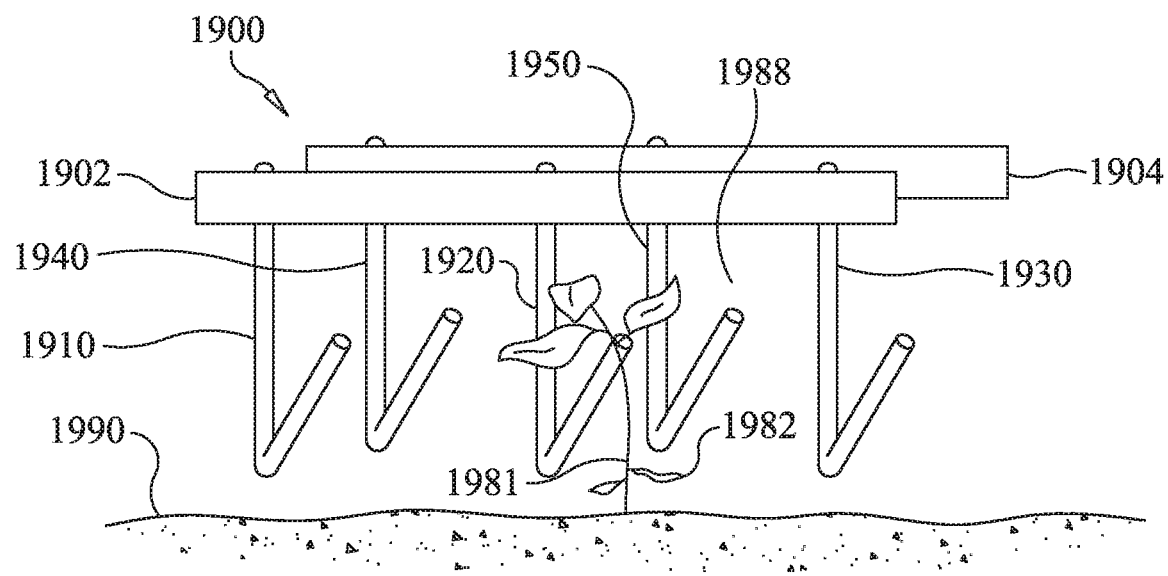
FIG. 19B illustrates a rear view of a row unit in a stress applying position for applying stress to a row of plants (e.g., soybean plants, corn plants, etc.) in accordance with one embodiment.

FIG. 19B illustrates a rear view of a row unit in a stress applying position for applying stress to a row of plants (e.g., soybean plants, corn plants, etc.) in accordance with one embodiment. The row unit 1900 includes a stress mechanism 1915 (e.g., sliding or oscillating crimpers or acting members 1910, 1920, 1930, 1940, 1950, etc.) that is illustrated as acting members 1920 and 1950 in FIG. 19B. However, any adjacent pair of crimpers or acting members can be a stress mechanism for applying stress to a soybean plant 1981. The stress mechanism may apply a force to the plants to cause growth of additional nodes. In one example, the stress mechanism 1115 applies stress to a stalk of the plant 1181 above cotyledon leaves 1182 and below trifoliolate leaves 1183.

FIG. 20A illustrates a rear view of a row unit for applying stress to a row of plants (e.g., soybean plants, corn plants, etc.) in accordance with one embodiment. The row unit 2000 includes connectors 2038 and 2039 to be preferably mounted to a transversely extending bar (e.g., frame 10 of FIG. 2, tool bar of any tractor or implement) or other component that is mounted to the transversely extending bar. The connectors provide support for angled acting members 2010 and 2020, which can rotate via extensions 2035 and 2036, respectively, as the row unit travels through a field having rows of early stage soybean plants and the angled acting members 2010 and 2020 contact a ground surface 2090. The angled acting members 2010 and 2020 can have an angle 2005 with respect to the ground surface 2090 between 0 and 90 degrees. In one embodiment, angle 2005 is not 0 or 90 degrees. Extensions 2035 and 2036 can provide a rotation for angled acting members 2010 and 2020 that is not horizontal (parallel to the ground) or vertical (perpendicular to the ground).

The acting members 2010 and 2020 may be positioned at a height slightly above a ground surface 2090 that causes an elevated or raised bump 2012, 2022 (e.g., ring) of each acting member to apply stress slightly above cotyledon leaf 2082 of a soybean plant 2081 and below trifoliolate leaves 2083 of the plant in one example and have a spacing 2092 (e.g., a gap, a 0.2-1 inch spacing, etc.) between the angled acting members to accept the plant. The angled acting member have a rigidity in order to apply the stress mechanism (e.g., crimping pressure, pinching pressure). The acting members 2010 and 2020 can have an adjustable height above the ground surface depending on a height of cotyledon leaves of the soybean plants.

FIG. 20B illustrates a top view of an acting member 2010 for applying stress to a row of plants (e.g., soybean plants, corn plants, etc.) in accordance with one embodiment. The acting member 2010 includes an elevated bump 2012 for applying stress to a soybean plant in combination with an elevated bump 2022 of the acting member 2020.

Figure 20D:
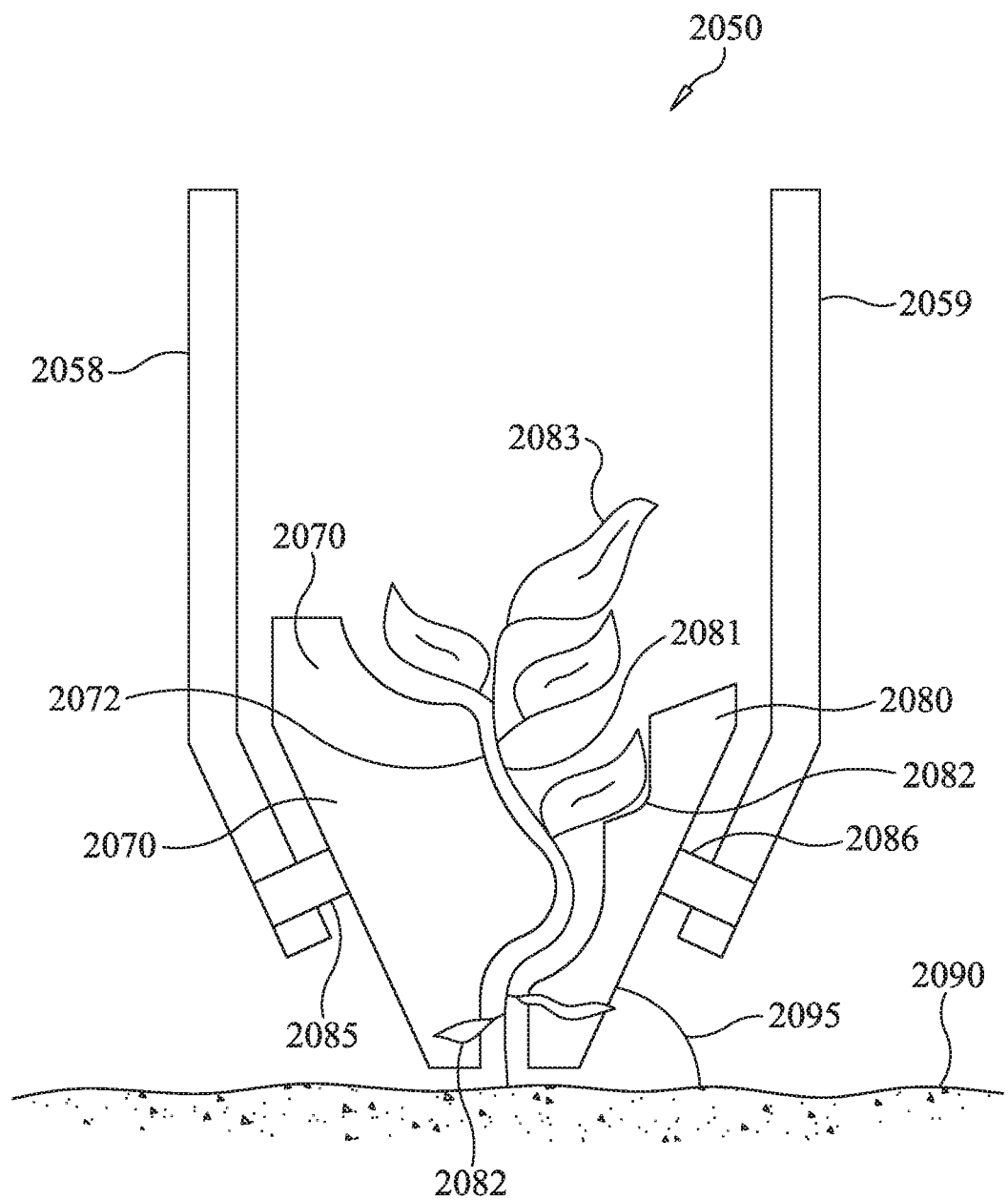
FIG. 20D illustrates a rear view of a row unit for applying stress to a row of plants (e.g., soybean plants, corn plants, etc.) in accordance with one embodiment.

FIG. 20C illustrates a side view of an acting member 2010 for applying stress to a row of plants (e.g., soybean plants, corn plants, etc.) in accordance with one embodiment. The acting member 2010 includes an elevated bump 2012 for applying stress to a soybean plant in combination with an elevated bump 2022 of the acting member 2020. FIGS. 20A-20C illustrate acting members with male bumps. However, the acting members can also have mated male/female geometries as illustrated in FIG. 20D.

FIG. 20D illustrates a rear view of a row unit for applying stress to a row of plants (e.g., soybean plants, corn plants, etc.) in accordance with one embodiment. The row unit 2050 includes connectors 2058 and 2059 to be preferably mounted to a transversely extending bar (e.g., frame 10 of FIG. 2, tool bar of any tractor or implement) or other component that is mounted to the transversely extending bar. The connectors provide support for angled male member 2070 and angled female member 2080, which can rotate via extensions 2085 and 2086, respectively, as the row unit travels through a field having rows of early stage soybean plants and the acting members 2070 and 2080 contact a ground surface 2090. The acting members 2070 and 2080 can have an angle 2095 with respect to the ground surface 2090 between 0 and 90 degrees. In one embodiment, angle 2095 is not 0 or 90 degrees. Extensions 2085 and 2086 can provide a rotation for angled male member 2070 and angled female member 2086 that is not horizontal (parallel to the ground) or vertical (perpendicular to the ground).

The acting members 2070 and 2080 may be positioned at a height slightly above a ground surface 2090 that causes an inner surface 2072, 2082 of each acting member to apply stress slightly above cotyledon leaf 2082 of a soybean plant 2081 and below trifoliolate leaves 2083 of the plant in one example and have a spacing (e.g., a gap, a 0.2-1 inch spacing, etc.) between the acting members to accept the plant. The acting member has a rigidity in order to apply the stress mechanism (e.g., crimping pressure, pinching pressure). The acting members 2070 and 2080 can have an adjustable height above the ground surface depending on a height of cotyledon leaves of the soybean plants.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An agricultural implement comprising:
   a bar transverse to a direction of travel of the agricultural implement through a field;
   a stress mechanism coupled to the bar through a downwardly extending frame and configured to be above a ground surface in operation such that the stress mechanism applies a force to a row of plants as the agricultural implement moves through the field wherein the stress mechanism comprises a roller to rotate over the row of plants; and
   a sensor configured to measure a distance from the implement to a ground surface or a plant.

2. The agricultural implement of claim 1, wherein the roller further comprises slats extending radially outward from the roller.

3. The agricultural implement of claim 1, further comprising a biasing element connected to the bar and the downwardly extending frame to apply a downforce to the stress mechanism.

4. The agricultural implement of claim 3, wherein the sensor is in communication with the biasing element to adjust a position of the downwardly extending frame.

5. The agricultural implement of claim 1, wherein the row of plants comprises a row of soybean plants having a trifoliolate soybean stage with trifoliolate leaves.

6. The agricultural implement of claim 1, wherein the stress mechanism comprises:
   a first acting member to be positioned in operation in proximity to a row of plants in a field; and
   a second acting member in proximity to the first acting member in operation, the first and second acting members form a stress mechanism to apply a force to the row of plants to promote growth of the row of plants as the agricultural implement moves through the field.

7. The agricultural implement of claim 6, wherein the first and second acting members are configured to pinch or crimp a stalk of the row of plants.

8. The agricultural implement of claim 1, wherein the agricultural implement is a side dress bar.

9. An agricultural implement comprising:
   a first bar transverse to a direction of travel of the agricultural implement through a field:
   a second bar coupled to the first bar through a downwardly extending frame and extending across a plurality of rows of plants, the second bar configured to be above a ground surface in operation such that the second bar contacts the row of plants and applies a force to a row of plants as the agricultural implement moves through the field; and
   a sensor configured to measure a distance from the implement to a ground surface or a plant.

10. The agricultural implement of claim 9, wherein the second bar is coupled to skis configured to engage a ground surface, and wherein the second bar is elevated above the ground surface supported by the skis.

11. An agricultural implement comprising:
    a bar transverse to a direction of travel of the agricultural implement through a field; and
    a stress mechanism coupled to the bar in operation such that the stress mechanism applies a force to a row of plants as the agricultural implement moves through the field, wherein the stress mechanism comprises a support frame connected to the bar, a first crimper and a second crimper disposed on the support frame, and a first actuator to slide the first crimper towards and away from the second crimper.

12. The agricultural implement of claim 11 further comprising a second actuator to slide the second crimper towards and away from the first crimper.

13. The agricultural implement of claim 11, wherein the support frame comprises a first support frame member connected to the bar, and a second support frame member connected to the bar, wherein the first crimper is attached to the first support frame member, the second crimper is attached to the second support frame member, and the first actuator is configured to move the first support frame to move the first crimper towards and away from the second crimper.

14. The agricultural implement of claim 13, further comprising a second actuator to move the second support frame to move the second crimper towards and away from the first crimper.

15. An agricultural implement comprising:
a bar transverse to a direction of travel of the agricultural implement through a field; and
a stress mechanism coupled to the bar in operation such that the stress mechanism applies a force to a row of plants as the agricultural implement moves through the field, wherein the stress mechanism is coupled to the bar through a downwardly extending frame, an axle is connected to the downwardly extending frame, and a first roller and a second roller are disposed on the axle, and the first roller is positioned to roll over a first row of plants, and the second roller is positioned to roll over a second row of plants.

16. An agricultural implement comprising:
a bar transverse to a direction of travel of the agricultural implement through a field; and
a stress mechanism coupled to the bar in operation such that the stress mechanism applies a force to a row of plants as the agricultural implement moves through the field, wherein the stress mechanism comprises a sickle, the sickle comprising a first member and a crimping member.

17. An agricultural implement comprising:
a bar transverse to a direction of travel of the agricultural implement through a field; and
a stress mechanism coupled to the bar in operation such that the stress mechanism applies a force to a row of plants as the agricultural implement moves through the field, wherein the stress mechanism comprises a rotating member having at least one rotating arm and a stationary bar disposed below the rotating arm.

18. The agricultural implement of claim 17, wherein the rotating member is connected to the bar separate from the stationary bar.

19. The agricultural implement of claim 17, wherein the stationary bar is connected to the rotating member.

20. The agricultural implement of claim 17, wherein the stationary bar comprises a first stationary bar and a second stationary bar both parallel to a direction of travel, and the first stationary bar disposed on a first side of the row of plants, and the second stationary bar disposed on a second side of the row of plants.

21. An agricultural implement comprising:
a bar transverse to a direction of travel of the agricultural implement through a field; and
a stress mechanism coupled to the bar in operation such that the stress mechanism applies a force to a row of plants as the agricultural implement moves through the field, wherein the stress mechanism comprises a lower member at a first height above a ground surface and an upper member at a second height above the ground surface, wherein the stress mechanism is configured such that a soybean stalk of a soybean plant reacts against the lower member and becomes crimped by the upper member such that the stress mechanism provides a stress to the soybean stalk above cotyledon leaves and below trifoliolate leaves.

22. An agricultural implement comprising:
a bar transverse to a direction of travel of the agricultural implement through a field; and
a stress mechanism coupled to the bar in operation such that the stress mechanism applies a force to a row of plants as the agricultural implement moves through the field, wherein the stress mechanism comprises:
a first connecter disposed on the bar and extending downward;
a first angled member rotatably mounted to the first connector, the first angled member having a first raised ring;
a second connecter disposed on the bar and extending downward; and
a second angled member rotatably mounted to the second connector, the second angled member having a second raised ring;
wherein the first angled member and the second angled member are spaced apart and configured to rotate in opposite directions in order to accept each plant of the row of plants and apply a sufficient stress to crimp a stalk with the first raised ring and the second raised ring above cotyledon leaves and below trifoliolate leaves.

23. The agricultural implement of claim 22, wherein the first angled member and the second angled member each rotate on an axis that is not horizontal and not vertical.

24. An agricultural implement comprising:
a bar transverse to a direction of travel of the agricultural implement through a field; and
a stress mechanism coupled to the bar in operation such that the stress mechanism applies a force to a row of plants as the agricultural implement moves through the field, wherein the stress mechanism comprises:
a first connecter disposed on the bar and extending downward;
an angled male member rotatably mounted to the first connector;
a second connecter disposed on the bar and extending downward; and
an angled female member rotatably mounted to the second connector;
wherein the angled male member and angled female member are spaced a certain distance apart and rotating in opposite directions in order to accept each soybean plant of the row of plants and apply a sufficient stress to crimp a stalk above cotyledon leaves and below trifoliolate leaves.

25. The agricultural implement of claim 24, wherein angled male member and angled female member each rotate on an axis that is not horizontal and not vertical.

26. An agricultural implement comprising:
a bar transverse to a direction of travel of the agricultural implement through a field;
a stress mechanism coupled to the bar through a downwardly extending frame and configured to be above a ground surface in operation such that the stress mechanism applies a force to a row of plants as the agricultural implement moves through the field, the stress mechanism comprising:

a first rotating member to be positioned in operation in proximity to the row of plants; and a second rotating member in proximity to the first acting member in operation, the first and second rotating members form a stress mechanism to apply a force to the row of plants to promote growth of the row of plants as the agricultural implement moves through the field; and wherein the row of plants comprises a row of soybean plants having a trifoliolate soybean stage with trifoliolate leaves, wherein the first and second rotating members are actuated based on contacting a ground surface while the agricultural implement moves through the field; and a sensor configured to measure a distance from the implement to a ground surface or a plant.

27. The agricultural implement of claim 26, wherein e the first and second acting members are configured to crimp a soybean stalk of a soybean plant at a target region of the soybean stalk that is above cotyledon leaves and below trifoliolate leaves.

28. An agricultural implement comprising:

a bar transverse to a direction of travel of the agricultural implement;

a stress mechanism disposed on the bar in operation such that the stress mechanism applies a force to the row of plants; and at least one drive configured to rotate the stress mechanism;

wherein the stress mechanism is coupled to the at least one drive in operation such that the drive causes the stress mechanism to apply the force to the row of plants in the field as the agricultural implement moves through the field.

29. The agricultural implement of claim 28, wherein the stress mechanism comprises a rotating member and a bar with the rotating member to rotate and contact the row of plants, wherein the plants comprise soybean plants with each soybean plant having a soybean stalk that reacts against the bar and becomes crimped by the rotating member such that the stress mechanism provides a stress to the soybean stalk above cotyledon leaves and below trifoliolate leaves.

30. The agricultural implement of claim 28, wherein the stress mechanism comprises a pair of rotating members spaced a certain distance apart and rotating in opposite directions in order to accept each soybean plant of the row of plants and apply a sufficient stress to crimp a soybean stalk above cotyledon leaves and below trifoliolate leaves.

31. The agricultural implement of claim 28, wherein the at least one drive is configured to rotate the stress mechanism in a substantially horizontal plane.

32. A method of crimping soybeans, the method comprising:

moving a stress mechanism on a bar of an agricultural implement through a field of early-stage soybeans;

applying, with the stress mechanism, a force to cause crimping of at least one row of plants as the agricultural implement moves through the field;

initiating a stress application prescription that relates georeferenced positions in the field to stress rates or down forces; and positioning the agricultural implement including the bar to be positioned transversely with respect to the at least one row of plants.

* * * * *